United States Patent
Maeda et al.

(10) Patent No.: US 12,291,199 B2
(45) Date of Patent: May 6, 2025

(54) MOVING BODY CONTROL SYSTEM

(71) Applicant: Hitachi, Ltd., Tokyo (JP)

(72) Inventors: Kenta Maeda, Tokyo (JP); Junya Takahashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1116 days.

(21) Appl. No.: 16/754,831

(22) PCT Filed: Oct. 20, 2017

(86) PCT No.: PCT/JP2017/038001
§ 371 (c)(1),
(2) Date: Apr. 9, 2020

(87) PCT Pub. No.: WO2019/077739
PCT Pub. Date: Apr. 25, 2019

(65) Prior Publication Data
US 2021/0197808 A1 Jul. 1, 2021

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *B60W 30/18163* (2013.01);
(Continued)

(58) Field of Classification Search
CPC .......... B60W 30/18163; B60W 40/04; B60W 30/182; B60W 2556/65; B60W 2050/0095
See application file for complete search history.

(56) References Cited

U.S. PATENT DOCUMENTS

| | | | |
|---|---|---|---|
| 9,524,648 B1* | 12/2016 | Gopalakrishnan ... | G05D 1/0055 |
| 2015/0248131 A1* | 9/2015 | Fairfield ............... | G05D 1/0033 |
| | | | 701/2 |
| 2018/0252539 A1 | 9/2018 | Yunoki | |

FOREIGN PATENT DOCUMENTS

| | | | |
|---|---|---|---|
| JP | 2007310698 A | * | 11/2007 |
| JP | 2010-134499 A | | 6/2010 |

(Continued)

OTHER PUBLICATIONS

International Search Report with English translation and Written Opinion issued in corresponding application No. PCT/JP2017/038001 dated Jan. 9, 2018.

*Primary Examiner* — Christian Chace
*Assistant Examiner* — Katherine Marie Fitzharris
(74) *Attorney, Agent, or Firm* — Foley & Lardner LLP

(57) ABSTRACT

A system includes a first device that controls a moving body and a second device that remotely controls the moving body. The first device obtains information around the moving body, movement information of the moving body, and remote control information. The first device calculates a control amount for controlling movement of the moving body based on one of the information and the movement information, switches autonomous movement and remote control of the moving body based on the remote-control information, and transmits one of the information, the movement information, and the control amount to the second device. The second device receives one of the information, the movement information, and the control amount, transmits the remote-control information to the first device, determines autonomous mobility of the moving body based on second information stored remotely, and generates the remote-control information including a determination result.

18 Claims, 16 Drawing Sheets

(51) Int. Cl.
*B60W 30/18* (2012.01)
*B60W 40/04* (2006.01)
*G09G 1/16* (2006.01)

(52) U.S. Cl.
CPC ............ *B60W 40/04* (2013.01); *G09G 1/165* (2013.01); *B60W 2400/00* (2013.01); *B60W 2554/404* (2020.02); *B60W 2554/80* (2020.02); *B60W 2710/18* (2013.01); *B60W 2710/20* (2013.01)

(56) References Cited

FOREIGN PATENT DOCUMENTS

| | | | |
|---|---|---|---|
| JP | 2016-181031 A | | 10/2016 |
| JP | 2016-181140 A | | 10/2016 |
| JP | 2016182906 A | * | 10/2016 |
| JP | 2017-174208 A | | 9/2017 |
| WO | WO-2017/145314 A1 | | 8/2017 |

* cited by examiner

MOVING BODY CONTROL SYSTEM

TECHNICAL FIELD

The present invention relates to a moving body control system which includes a moving body control device for a moving body that is capable of autonomous movement, and a control device that remotely controls the moving body in a case where the moving body becomes unable to continue autonomous movement.

BACKGROUND ART

As a conventional moving body control system that controls a moving body capable of autonomous movement, there is known a technique in which the autonomous movement is continued to a predetermined stop position, in a case where an abnormality occurs in the moving body or in a case where an abnormality occurs in communication with the control device.

For example, in the abstract of PTL 1, there is disclosed a technique that "the automatic travel control device (12) is mounted on an automatic travel vehicle (10) that automatically travels along a path, and includes a control information acquisition unit (20, 22), a candidate position acquisition unit (20), and an automatic travel control unit (22). The control information acquisition unit includes control information acquired by communication from a control device for controlling the automatic travel vehicle, and acquires control information for controlling the automatic travel vehicle. The candidate position acquisition unit acquires a stop candidate position at which the automatic travel vehicle may stop. The automatic travel control unit causes the automatic travel vehicle to automatically travel based on the control information acquired by the control information acquisition unit, and when communication with the control device is interrupted, the automatic travel vehicle automatically travels to the stop candidate position acquired by the candidate position acquisition unit," so that, If the stop candidate position is acquired in advance from the control device, and even if communication with the control device is interrupted, the automatic travel is continued to the stop candidate position so as to continue automatic travel as much as possible.

In addition, the abstract of PTL 2 described that "the automatic travel control device includes an acquisition unit to acquire automatic traveling information which is information relating to the state of the own vehicle and the surroundings of the own vehicle, which is necessary for the automatic traveling to drive the own vehicle toward the destination, an automatic traveling unit to control a traveling direction and a speed of the own vehicle based on the automatic traveling information and to perform the automatic traveling, a determination unit (S200, S215) to determine whether there occurs trouble related to the automatic traveling information, and a changing unit (S205, S210, S225 to S255) to change a state of the traveling of the own vehicle or a state of another vehicle according to a content of the trouble in a case where there occurs trouble." Claim 5 describes "the automatic travel control device, further comprising: a detection unit (S230) to detect an evacuation area where the own vehicle can be stopped without hindering traveling of another vehicle, wherein the changing unit moves the own vehicle to the evacuation area by the alternative automatic traveling and stops the own vehicle in a case where there occurs the trouble." In other words, the document discloses a technology in which, when trouble such as a steering abnormality or a decrease in own position estimation accuracy occurs in a vehicle in automatic traveling, the vehicle automatically travels to a retrieved evacuation area and then automatically stops.

CITATION LIST

Patent Literatures

PTL 1: JP 2016-181140 A
PTL 2: JP 2016-181031 A

SUMMARY OF INVENTION

Technical Problem

The related arts of PTL 1 and PTL 2 attempt to autonomously move and stop at a stop candidate position or an evacuation area without assistance from a traffic control device when a communication interruption or a moving body abnormality occurs. To realize this, there is required a high-performance and expensive control device that can appropriately control the own vehicle even when communication is interrupted and can appropriately determine an abnormal state of the own vehicle (a state in which autonomous movement cannot be continued).

However, in a case where a low-performance control device must be mounted on a moving body due to cost constraints, the control device lacks redundancy and lacks computational power, and as disclosed in PTL 1 and PTL 2, there is a possibility that continuation of autonomous movement or appropriate determination of an abnormal state cannot be realized when communication is interrupted.

The present invention has been made in view of these circumstances, and an object thereof is to provide a moving body control system that appropriately switches from autonomous control to remote control in response to an instruction from a control device by predicting the future autonomous movement discontinuation in the control device side before the autonomous movement continuation becomes impossible.

Solution to Problem

In order to achieve the above object, a moving body control system according to the present invention includes a moving body control device that is mounted on a moving body capable of an autonomous movement, and a control device that controls the moving body from a remote place. The moving body control device includes an external information acquisition unit to acquire external information of the moving body, a movement information acquisition unit to acquire movement information of the moving body, a control unit to predict a future state of the moving body based on the external information and the movement information, and a moving body-side communication unit to communicate with the control device. The control device includes a control device-side communication unit to communicate with the moving body control device, a control simulator to predict a future state of the moving body based on the external information and the movement information received from the moving body control device, and an autonomous mobility determination unit that compares the future states predicted by the control unit and the control simulator and determines whether the autonomous movement of the moving body can be continued.

Advantageous Effects of Invention

According to the present invention, it is possible to provide a moving body control system that switches from autonomous control to remote control by an instruction of a control device before the moving body cannot continue autonomous movement.

DESCRIPTION OF EMBODIMENTS

Hereinafter, embodiments of the present invention will be described with reference to the drawings.

First Embodiment

A moving body control system according to a first embodiment will be described with reference to FIGS. 1 to 9, FIG. 17, and FIG. 18. Further, in the following, an example will be described in which a moving body to be controlled by the moving body control system is an autonomously moving vehicle 21.

Figure 1:
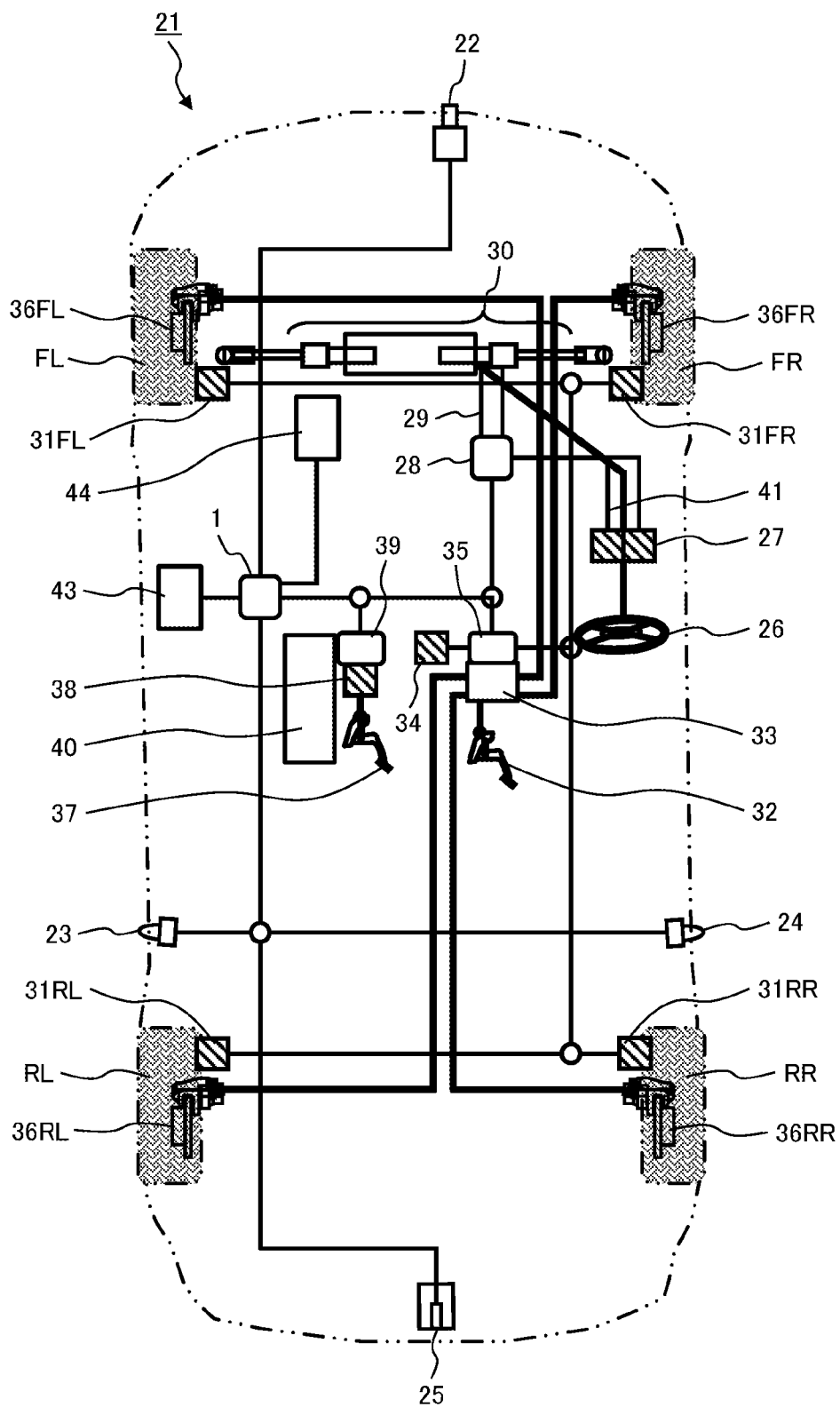
FIG. 1 is an overall configuration diagram of a vehicle to be controlled by a moving body control system according to a first embodiment.

FIG. 1 is an overall configuration diagram of the vehicle 21 equipped with an in-vehicle control device 1 (moving body control device) forming the moving body control system of this embodiment, and is a diagram in which the vehicle 21 is viewed from above. In this drawing, FL represents the left front wheel, FR represents the right front wheel, RL represents the left rear wheel, and RR represents the right rear wheel. By adding FL or the like after each symbol, the configuration related to which wheel is distinguished.

The in-vehicle control device 1 includes a ROM, a RAM, a CPU, and an input/output device. The CPU executes a program loaded from the ROM to the RAM, thereby autonomously controlling each part of the vehicle 21 based on a travel plan described later. In addition, even when a control device 2 described later remotely controls the vehicle 21, the in-vehicle control device controls various parts of the vehicle 21 based on remote control information from the control device 2 received via an in-vehicle communication device 43 that performs communication between the road and the vehicle.

More specifically, the in-vehicle control device 1 calculates sequentially command values of actuators such as a steering control mechanism 30, a brake control mechanism 33, and a drive control mechanism 40, which are necessary when the vehicle 21 travels in accordance with a travel plan or a command from the control device 2, and outputs the command values to a steering control device 28 for controlling the steering control mechanism 30, a brake control device 35 for controlling the brake control mechanism 33 to adjust the braking force distribution of each wheel, and a drive control device 39 that controls the drive control mechanism 40 and adjusts the torque output of a drive actuator such as an engine or a motor, so that a desired autonomous traveling is realized.

Sensors 22, 23, 24, and 25 for recognizing the external world are provided on the front, rear, left, and right sides of the vehicle 21. These sensors can detect a relative distance and a relative speed with objects such as other vehicles, bicycles, pedestrians, and obstacles existing around the vehicle 21. For example, a fisheye camera having a 180° viewing angle may be used. In addition, instead of the fisheye camera, a sensor combined with an ultrasonic sensor, a stereo camera, an infrared camera, or the like may be used.

Further, a laser radar mounted on the ceiling of the vehicle 21 and capable of sensing the surrounding area of 360° may be used.

The in-vehicle control device 1 creates a travel plan based on external information obtained from these sensors, and calculates command values to the steering control mechanism 30 and the like based on the travel plan. Then, the vehicle 21 can autonomously move according to the external situation by inputting these command values to the steering control device 28 and the like. Further, the travel plan of the vehicle 21 and the like may be displayed on a display device 44 provided in the driver's seat.

Next, the operation of the brake of the vehicle 21 will be described. In a state where the driver is driving the vehicle 21, the driver boosts a depression force on a brake pedal 32 by a brake booster (not illustrated), and a master cylinder (not illustrated) generates a hydraulic pressure according to the force. The generated hydraulic pressure is supplied to wheel cylinders 36FL, 36FR, 36RL, and 36RR provided on each wheel via the brake control mechanism 33. The wheel cylinders 36FL to 36RR include a cylinder, a piston, a pad, a disk rotor, and the like (not illustrated). The piston is propelled by hydraulic fluid supplied from the master cylinder, and the pad connected to the piston presses the disk rotor. Incidentally, the disk rotor rotates together with the wheels. Therefore, the brake torque acting on the disk rotor becomes a braking force acting between the wheels and the road surface. As described above, a braking force can be generated on each wheel according to the driver's brake pedal operation. Further, in the vehicle of this embodiment, it is not always necessary to mount a brake booster or a master cylinder, and the brake pedal 32 and the brake control mechanism 33 may be directly connected, and the brake control mechanism 33 may operate directly when the driver steps on the brake pedal 32.

Although not illustrated in detail in FIG. 1, the brake control device 35 includes, for example, a CPU, a ROM, a RAM, and an input/output device, like the in-vehicle control device 1. The brake control device 35 receives, for example, a sensor signal from a combine sensor 34 capable of detecting a longitudinal acceleration, a lateral acceleration, and a yaw rate, wheel speed sensors 31FL, 31FR, 31RL, and 31RR installed on each wheel, and the steering wheel angle detection device 41 via the steering control device 28 described later, and a braking force command value from the in-vehicle control device 1. In addition, the output of the brake control device 35 is connected to a pump (not illustrated) and a brake control mechanism 33 having a control valve, and can generate an arbitrary braking force on each wheel independently of the driver's operation of the brake pedal. The in-vehicle control device 1 can generate an arbitrary braking force in the vehicle 21 by communicating the brake command (value) to the brake control device 35, and takes a charge of automatically performing braking in the automatic driving in which the driver's operation does not occur. However, this embodiment is not limited to the above-described brake control device, and another actuator such as a brake-by-wire may be used.

Next, the steering operation of the vehicle 21 will be described. In a state where the driver is driving the vehicle 21, the steering torque and the steering wheel angle input by the driver via a steering wheel 26 are detected by a steering torque detection device 27 and the steering wheel angle detection device 41, respectively. The steering control device 28 controls a motor 29 based on the information to generate assist torque. Although not illustrated in detail in FIG. 1, the steering control device 28 also has, for example, a CPU, a ROM, a RAM, and an input/output device, like the in-vehicle control device 1. The steering control mechanism 30 is moved by the combined force of the driver's steering torque and the assist torque by the motor 29, and the front wheels (FL wheels, FR wheels) are turned. On the other hand, according to the turning angle of the front wheels, a reaction force from the road surface is transmitted to the steering control mechanism 30 and transmitted to the driver as a road surface reaction force. Further, in the vehicle of this embodiment, it is not always necessary to mount the steering torque detection device 27. When the driver operates the steering wheel 26, the steering control device 28 may not operate, and no assist torque may be generated (the so-called heavy steering mechanism).

The steering control device 28 can generate a torque by the motor 29 independently of the driver's steering operation to control the steering control mechanism 30. Therefore, by transmitting the steering force command (value) to the steering control device 28, the in-vehicle control device 1 can control the front wheels to an arbitrary turning angle, and is automatically operated in automatic driving in which no driver operation occurs. However, this embodiment is not limited to the steering control device, and another actuator such as a steer-by-wire may be used.

Next, the operation of the accelerator of the vehicle will be described. The depression amount of an accelerator pedal 37 of the driver is detected by a stroke sensor 38 and input to the drive control device 39. Although not illustrated in detail in FIG. 1, the drive control device 39 also has, for example, a CPU, a ROM, a RAM, and an input/output device, like the in-vehicle control device 1. The drive control device 39 adjusts a throttle opening in accordance with the depression amount of the accelerator pedal 37, and controls the engine. As described above, the vehicle 21 can be accelerated according to the operation of the accelerator pedal by the driver. In addition, the drive control device 39 can control the throttle opening independently of the accelerator operation by the driver. Therefore, the in-vehicle control device 1 can generate an arbitrary acceleration in the vehicle 21 by communicating the acceleration command (value) to the drive control device 39, and takes a charge of automatically performing the acceleration in the automatic driving in which the driver's operation does not occur. Further, it is not always necessary that the vehicle is an engine vehicle of this embodiment, and the main drive device may be an electric motor. In this case, the drive control device 39 calculates a motor torque command value according to the depression amount of the accelerator pedal 37, and performs current control so that an inverter device (not illustrated) realizes the motor torque command value.

Further, in the above description, the vehicle in which the steering wheel 26, the accelerator pedal 37, and the brake pedal 32 are mounted has been described. However, the vehicle may not be provided with these input devices. In this case, the vehicle is a fully automatic driving vehicle in which the driver does not operate, a remote driving vehicle that travels in response to a traveling command remotely, and the like.

Figure 2:
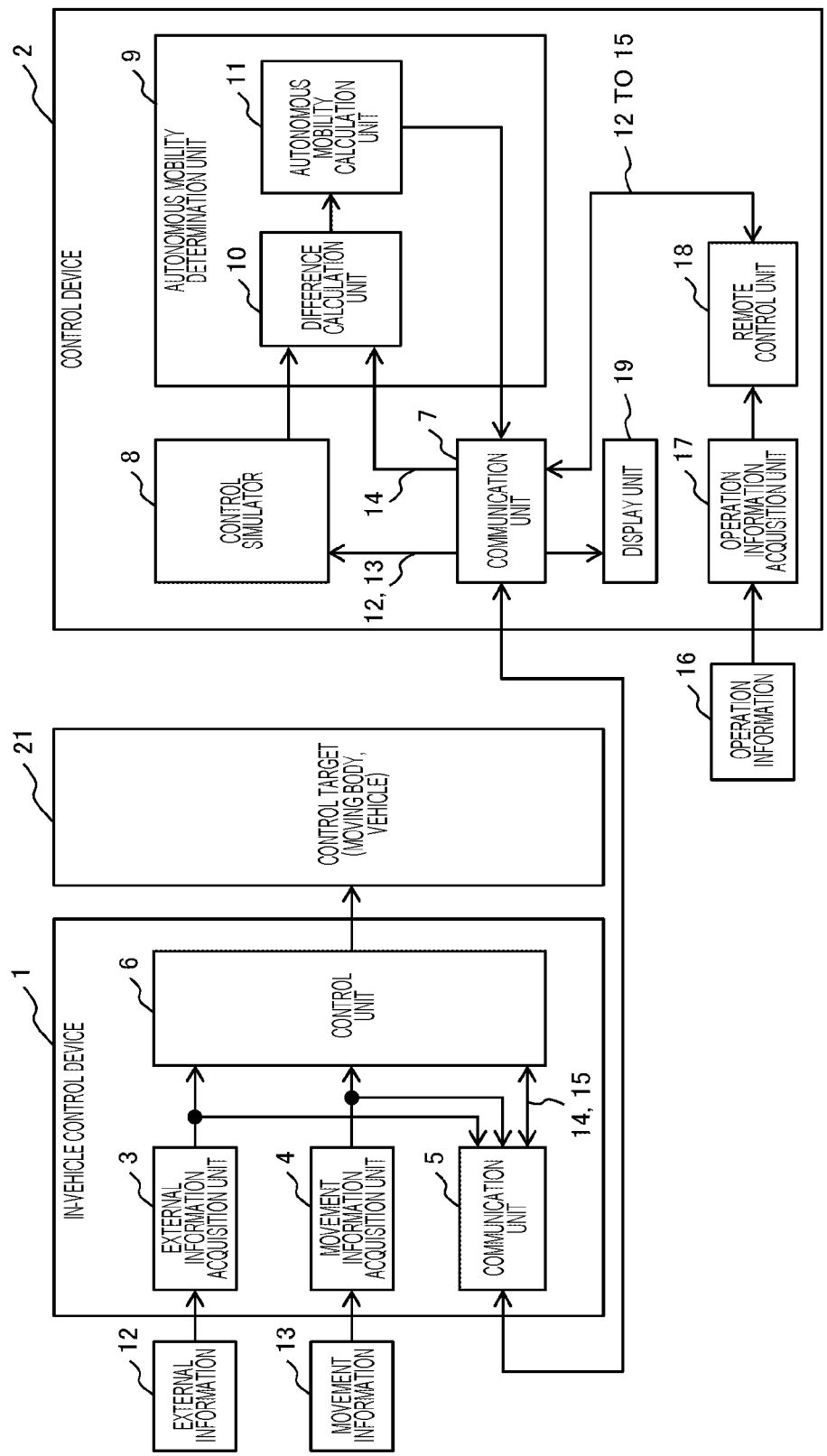
FIG. 2 is a functional block diagram of the moving body control system according to the first embodiment.

FIG. 2 is a functional block diagram of the moving body control system of this embodiment. As illustrated here, the moving body control system of this embodiment includes the in-vehicle control device 1 that controls the vehicle 21 and the control device 2 that is installed at a remote place, and establishes a wireless communication between a communication unit 5 of the vehicle 21 and a communication unit 7 of the control device 2, so that the in-vehicle control device 1 and the control device 2 can communicate with each other. Further, as a communication method, a communication method dedicated to road-to-vehicle communication (a radio beacon, an optical beacon, or the like) may be used, or a cellular line (4G line) or the like may be used.

In addition, the in-vehicle control device 1 includes an external information acquisition unit 3, a movement information acquisition unit 4, the communication unit 5, and a control unit 6. Some or all of these are realized by the CPU of the in-vehicle control device 1 executing a program loaded in the RAM.

The external information acquisition unit 3 obtains external information 12 from at least one of the sensors 22 to 25. Then, from the acquired external information 12, the position information and the size of the object (obstacle and the like) around the vehicle 21 and, if the object is a moving body, the position and speed information of the moving body are obtained. In addition, when a road sign, a road surface paint, a traffic light, or the like is detected, the position and the type thereof are obtained. For example, when the image data of the sensor 22 is used as the external information 12, it is possible to identify the types of a plurality of objects at the same time and acquire information. In particular, a stereo camera using two cameras is advantageous because a relative distance and a relative speed of a moving body or an obstacle can be detected. Then, the acquired external information 12 is stored in a storage device (not illustrated) such as a RAM in the in-vehicle control device 1.

The movement information acquisition unit 4 acquires movement information 13 (current position specifying information and operation state amount information) of the vehicle 21 and stores it in a storage device such as a RAM. In the acquisition process of the current position specifying information, for example, the current position of the vehicle 21 is acquired by a GPS (not illustrated), and the traveling angle is acquired with time of the position information if the vehicle 21 is moving. In addition, if two GPSs are attached to the front and rear of the vehicle 21, the traveling angle can be acquired even when the vehicle is being stopped. On the other hand, in the acquisition processing of the operation state amount information, for example, the speed, the longitudinal acceleration, the lateral acceleration, the yaw rate, the yaw angle, and the like are acquired from the combine sensor 34.

The communication unit 5 receives the remote control information 15 (described later) from the control device 2 via the in-vehicle communication device 43, and stores it in a storage device such as a RAM. In addition, the external information 12, the movement information 13, and internal information 14 (described later) of the control unit 6 stored in the storage device are transmitted to the control device 2. The external information 12 transmitted to the control device 2 is information of moving body, road surface paint, sign information, etc. detected at least around the vehicle. The output value of a sensor mounted on the vehicle 21 may be transmitted as it is, and a recognition result obtained by performing a predetermined process on the output value of the sensor may be transmitted. Alternatively, both may be transmitted, or the type of data to be transmitted may be changed according to the communication status. In addition, the movement information 13 transmitted to the control device 2 is the current position and the advancing angle of the vehicle 21.

The control unit 6 of the in-vehicle control device 1 calculates a travel plan using at least one of the external information 12, the movement information 13, and the remote control information 15 (described later), and determines the operation of the vehicle 21 to be controlled based on the calculated travel plan. Then, a control command value of each actuator mounted on the vehicle 21 is calculated so as to realize this operation. In a case where the in-vehicle control device 1 is configured to directly control the actuators, a physical quantity for operating each actuator is calculated. For example, in the case of an inter-vehicle distance control system, an acceleration command value of a vehicle is calculated according to a setting of an inter-vehicle distance to a preceding vehicle, a setting of a maximum speed, and the like, and an engine throttle and a brake pressure are adjusted so as to realize the acceleration command value. In a case where the first embodiment is applied to the automatic driving system, the travel plan is a trajectory and a speed at which the vehicle 21 is to travel, and calculates a steering angle command value and a vehicle acceleration command value to satisfy the travel plan.

In addition, the control unit 6 transmits the calculated value inside the control unit as internal information 14 to the control device 2 via the communication unit 5. Examples of the internal information 14 include a travel plan (a target traveling trajectory, a target speed, and the like), a control command value for each actuator, and the like. In addition, a variable value, a constant value, or the like during the calculation may be included in the internal information 14.

In addition, a traveling range management unit (not illustrated) may be provided inside the control unit 6. The traveling range management unit generates a travelable range (not illustrated) of the vehicle 21 based on the external information 12, the movement information 13, and the remote control information 15, and stores the generated traveling range in a storage device. Alternatively, the travelable range generated in advance may be acquired from outside. For example, map information is used as the travelable range. The map information is information on the road shape, traffic regulations, landmarks, and the like on which the vehicle 21 is to travel, and is used when generating a travel plan for the vehicle 21 and controlling the travel of the vehicle 21 according to the travel plan. For example, in a case where the vehicle 21 performs a right/left turn operation at an intersection, information on an intersection at which the vehicle 21 turns right/left is acquired. As the intersection/road information, for example, there are the number of lanes of the road at the intersection, the road width, the intersection angle of the road, the lane width, the width of the median strip, the width of the pedestrian crossing, the amount of setback from the intersection of the pedestrian crossing, the presence or absence of a signal, etc. Alternatively, if the external information 12 can obtain the position of an object around the vehicle 21 as a point group, information obtained by integrating the point group may be defined as a travelable range.

On the other hand, the control device 2 installed at a remote place also has a built-in CPU, ROM, RAM, and input/output device. The CPU executes a program loaded from the ROM to the RAM, thereby realizing the functions of the communication unit 7, a control simulator 8, an autonomous mobility determination unit 9, an operation information acquisition unit 17, a remote control unit 18, and a display unit 19.

The communication unit 7 transmits the remote control information 15 to the vehicle 21 via a cellular line or the like, acquires the external information 12, the movement information 13, and the internal information 14 from the vehicle 21, and stores the acquired information in a storage unit such as a RAM (not illustrated).

The control simulator 8 simulates the operation (calculation) of the control unit 6 of the in-vehicle control device 1.

In other words, using the external information 12 and the movement information 13 acquired via the communication unit 7, a travel plan is calculated using the same means (algorithm) as the control unit 6 of the in-vehicle control device 1, and the operation of the vehicle 21 to be controlled is determined based on this travel plan. Then, a control command value of each actuator mounted on the vehicle 21 is calculated so as to realize this operation.

Normally, the CPU, RAM, and the like of the control device 2 have higher performance than the CPU, RAM, and the like of the in-vehicle control device 1 for which cost reduction is strongly desired. As described above, the control simulator 8 is realized using the high-performance CPU, RAM, and the like of the control device 2. However, the simulation may be realized which simulates the performance equivalent to the CPU, RAM, and the like of the in-vehicle control device 1, and limits the performance. The travel plan may be calculated using a means (algorithm) that is more advanced than the control unit 6 by taking advantage of the higher performance than the in-vehicle control device 1. Alternatively, a travel plan using the same means as the control unit 6 and a travel plan using more advanced means than the control unit 6 may be simultaneously performed. In this case, more information (determination material) used for the determination of the autonomous mobility determination unit 9 described later is increased, so that a more reliable determination can be made.

The autonomous mobility determination unit 9 compares the internal information 14 of the in-vehicle control device 1 with the control command value of each actuator calculated by the control simulator 8 and the internal calculation value, and determines whether the vehicle 21 to be controlled can continue autonomous movement. Hereinafter, the function of the autonomous mobility determination unit 9 will be described separately for a difference calculation unit 10 and an autonomous mobility calculation unit 11.

The difference calculation unit 10 calculates a difference between the internal information 14 of the in-vehicle control device 1 and a control command value of each actuator calculated by the control simulator 8 or an internal calculation value. Specifically, a travel plan (a target traveling trajectory, a target speed, and the like), a control command value of each actuator, a variable value during calculation, a constant value, and the like are targets of deviation calculation in the difference calculation unit 10. Hereinafter, an example of the deviation calculation method will be described with reference to FIGS. 3 to 5.

Figure 3:
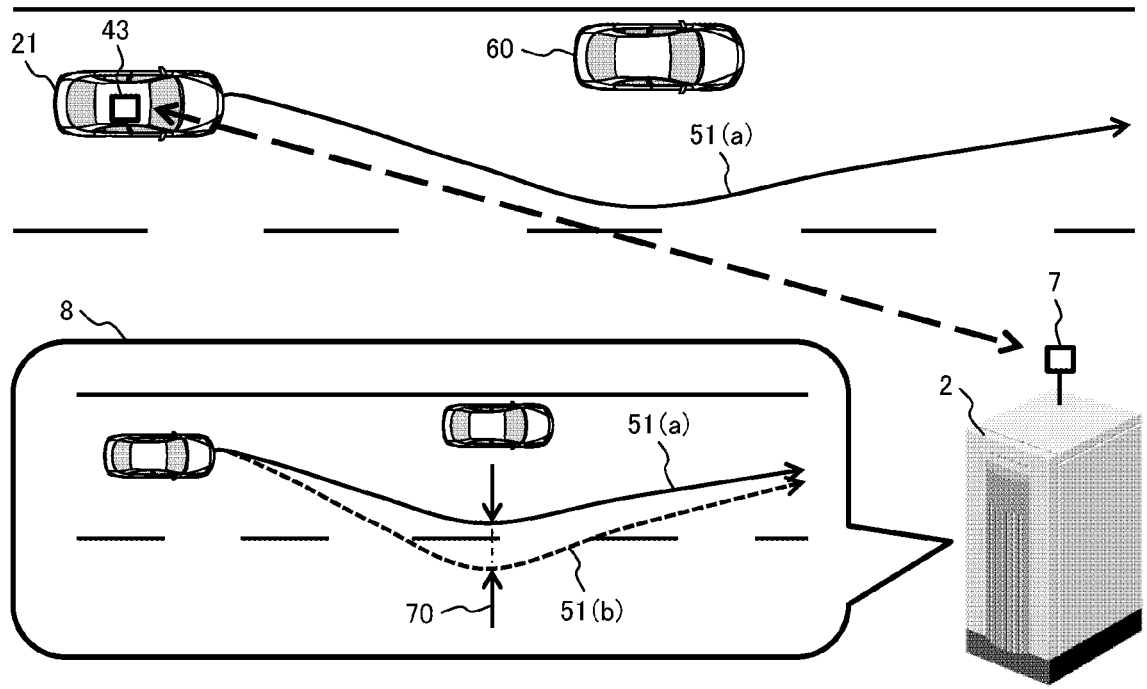
FIG. 3 is an explanatory diagram illustrating an example of calculating a deviation of a target traveling trajectory in the first embodiment.

FIG. 3 is an explanatory diagram illustrating a method of calculating a deviation of a target traveling trajectory as an example of a deviation calculation method. In the drawing, during the autonomous movement of the vehicle 21, there is a stationary obstacle 60 (illustrated here as a parked vehicle) on the target traveling trajectory (lane), and correction of the target traveling trajectory to avoid this stationary obstacle 60 is assumed.

First, the information on the stationary obstacle 60 is acquired as the external information 12 by the in-vehicle control device 1 using the sensor 22 or the like. Then, the control unit 6 generates a target traveling trajectory 51(a) based on the position of the stationary obstacle 60 so as to avoid a collision. At the same time, the target traveling trajectory 51(a) is transmitted as internal information 14 of the control unit 6 to the control device 2 via the in-vehicle communication device 43 together with the external information 12. In addition, the control simulator 8 of the control device 2 also generates a target traveling trajectory 51(b) for avoiding the collision with the stationary obstacle 60 based on the external information 12 and the movement information 13 acquired from the vehicle 21. Then, the deviation calculation unit 10 calculates a deviation 70 that maximizes the difference between the target traveling trajectory 51(a) generated by the control unit 6 and the target traveling trajectory 51(b) generated by the control simulator 8.

One possible cause of such a deviation 70 is that the variable value stored in the control unit 6 has changed from the design value due to a failure or the like, and the target traveling trajectory 51(a) has not been calculated normally. In addition, there is a possibility that an appropriate target traveling trajectory 51(a) is not generated due to the limit of the computational power of the in-vehicle control device 1. In a case where the deviation 70 is equal to or larger than a predetermined value, the autonomous movement of the vehicle 21 becomes a trajectory greatly deviated from the prediction of the control unit 6, and the possibility of occurrence of trouble such as collision with the stationary obstacle 60 or another obstacle increases. In this situation, the autonomous mobility calculation unit 11 to be described later should determine that the continuation of the autonomous movement by the in-vehicle control device 1 is not allowed. Further, here, the maximum value of the position deviation is illustrated as the deviation 70, but an average value or a variance may be used as the deviation 70.

Figure 4:
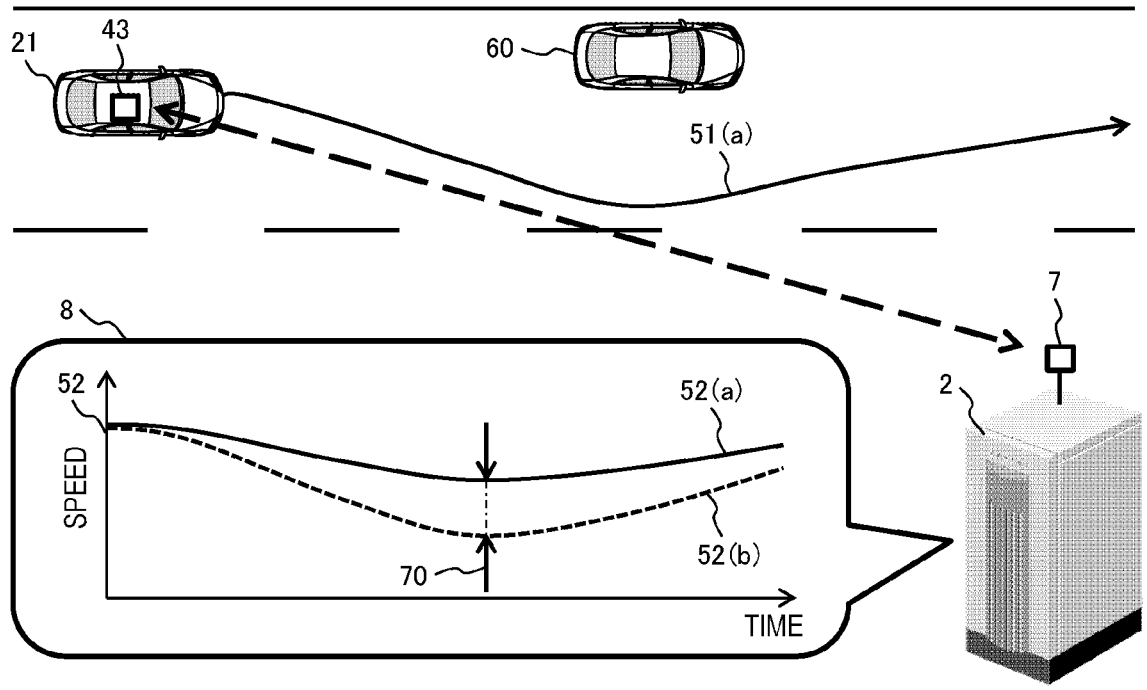
FIG. 4 is an explanatory diagram illustrating an example of calculating a deviation of a target speed in the first embodiment.

FIG. 4 is an explanatory diagram illustrating a method of calculating a deviation of a target speed as an example of a deviation calculation method. The situation around the vehicle 21 is the same as that in FIG. 3, and here, the control unit 6 calculates a target speed 52(a) as the speed when avoiding the stationary obstacle 60. The target speed 52(a) at this time is transmitted to the control device 2 together with the external information 12 and the movement information 13 as the internal information 14, and the control simulator 8 calculates a target speed 52(b). Then, the difference calculation unit 10 calculates a deviation 70 of the target speed.

Figure 5:
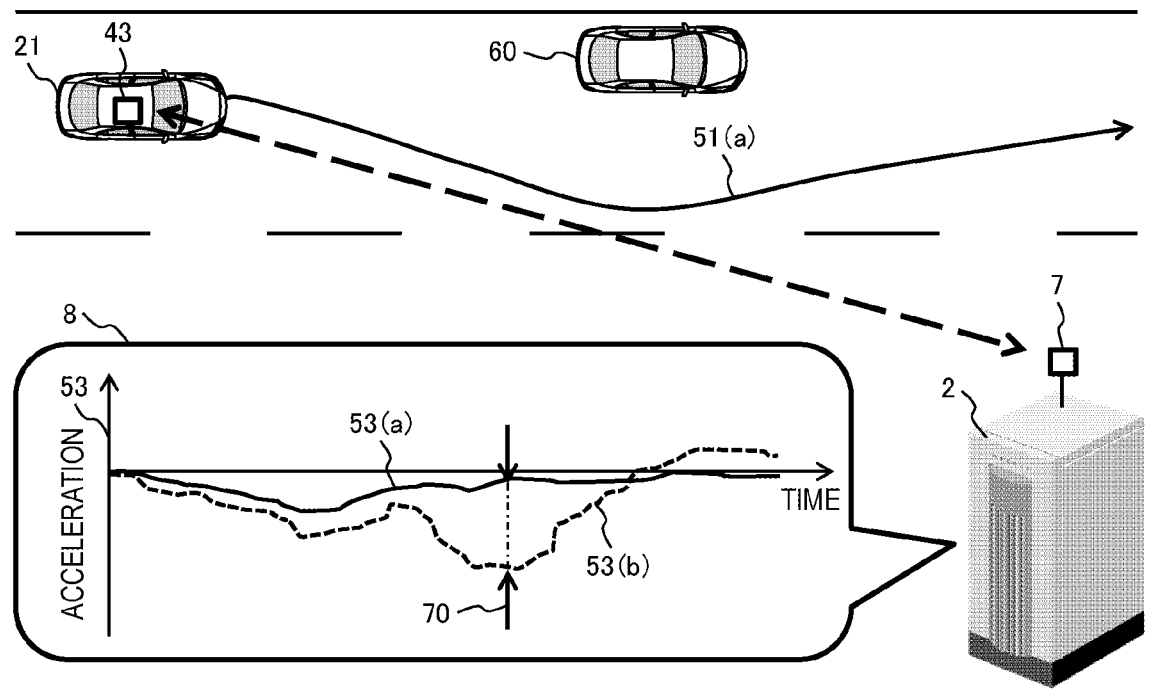
FIG. 5 is an explanatory diagram illustrating an example of calculating a deviation of a target acceleration in the first embodiment.

In addition, FIG. 5 is an explanatory diagram illustrating a method of calculating a deviation of a target acceleration as an example of a deviation calculation method. The situation around the vehicle 21 is the same as in FIGS. 3 and 4, and here, the control unit 6 calculates a target acceleration 53(a) as the acceleration when avoiding the stationary obstacle 60. The target acceleration 53(a) is transmitted as internal information to the control device 2 together with the external information 12 and the movement information 13, and the control simulator 8 calculates a target acceleration 53(b). Then, the difference calculation unit 10 calculates a deviation 70 of the target acceleration.

Also in a case where the deviation 70 of FIGS. 4 and 5 is equal to or more than the predetermined value, the autonomous movement of the vehicle 21 has a speed greatly deviated from the prediction of the control unit 6, or an acceleration, and the possibility of occurrence of unexpected failure increases. Therefore, the autonomous mobility calculation unit 11, which will be described later, is in a situation where it is determined that continuation of the autonomous movement by the in-vehicle control device 1 is not allowed. Further, even here, the maximum value of the deviation is illustrated as the deviation 70, but an average value or a variance may be used as the deviation 70.

Further, in addition to FIGS. 3 to 5, the control target amount of each actuator may be compared using the target steering angle, the target accelerator opening, the target brake stroke, and the like as the deviation 70.

The autonomous mobility calculation unit 11 determines the autonomous movement continuity of the vehicle 21 based on the deviation 70 calculated by the difference calculation unit 10. For example, the determination result is 0 (autonomous movement continuation is not allowed) in a case where the deviation 70 is equal to or more than a predetermined value, and 1 (autonomous movement continuation is allowed) in a case where the deviation 70 is less than the predetermined value. However, as the deviation 70 is larger, a continuous value such as a degree of reliability may be calculated so that the numerical value becomes lower. The calculated autonomous movement continuity is transmitted as a part of the remote control information 15 to the in-vehicle control device 1 via the communication unit 7, and the in-vehicle control device 1 switches the control method of the vehicle 21 accordingly.

The operation information acquisition unit 17 is for a remote operator to input the operation information 16 and remotely control the vehicle 21 in a case where the autonomous mobility calculation unit 11 determines that the autonomous movement cannot be continued.

The remote control unit 18 generates the remote control information 15 for remotely controlling the vehicle based on the operation information 16 input by the remote operator, and transmits the remote control information 15 to the in-vehicle control device 1 via the communication unit 7. The remote control information 15 at this time changes according to the type of the operation information 16 from the remote operator. For example, in a case where the remote operator directly operates the steering wheel, the accelerator, and the brake to input the operation information 16, the remote control information 15 includes the target steering angle, the target accelerator opening, the target brake stroke, and the like. In addition, the remote control information 15 may include a flag of 0 or 1 for instructing departure/stop, a continuous value of the target speed, and the like. Which remote control information 15 is to be used may be appropriately selected by the remote operator according to the situation.

The display unit 19 is a display, a tablet terminal, or the like, and displays information necessary for remote control by the remote operator. From the information displayed on the display unit 19, the remote operator checks the state of the vehicle 21 in which autonomous movement cannot be continued, or the surrounding situation and remotely controls the vehicle 21 or inputs an instruction to assist the control as the operation information 16.

Next, an example of the operation information acquisition unit 17, the remote control unit 18, and the display unit 19 will be described using FIG. 6. The display unit 19 in FIG. 6 is configured such that an image captured by the sensor 22 provided in front of the vehicle is displayed, and the remote operator operates the operation information acquisition unit 17 (the steering wheel 26, the accelerator pedal 37, the brake pedal 32) to input the operation information 16.

Figure 6:
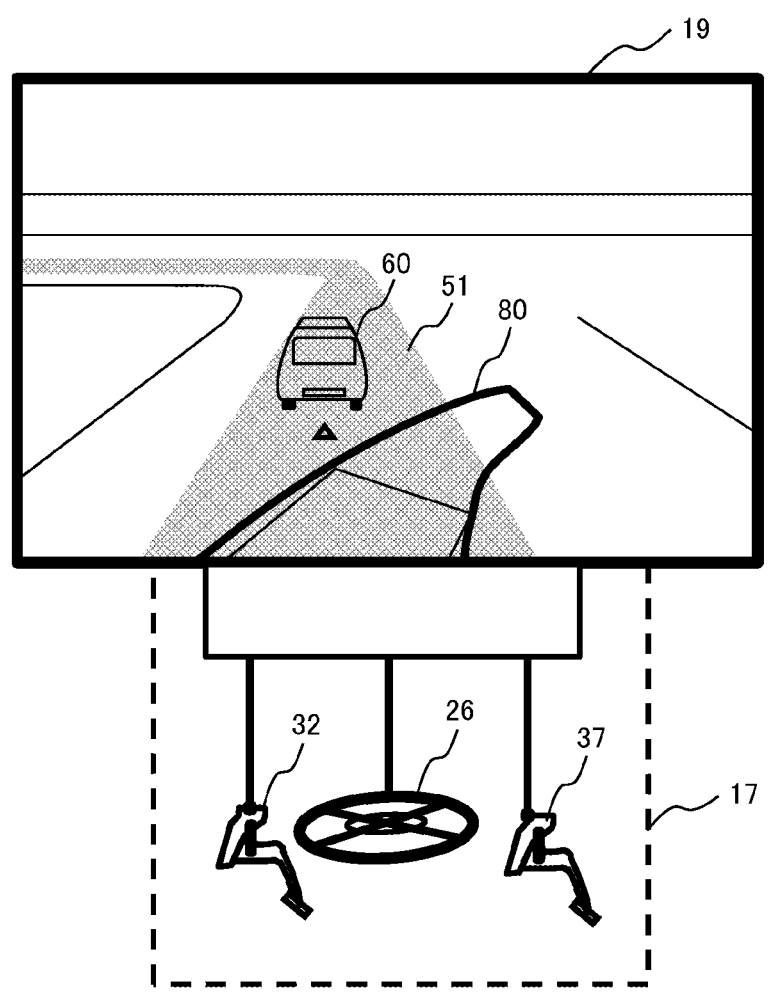
FIG. 6 is an explanatory diagram illustrating an example of an operation information acquisition unit and a display unit in the first embodiment.

Displayed on the display unit 19 in FIG. 6 is a situation that, since there is the stationary obstacle 60 (parked vehicle) on the target traveling trajectory 51 of the vehicle 21 and the presence or absence of an oncoming vehicle is not known in a relation of the recognition capability of the external information acquisition unit 3, the in-vehicle control device 1 cannot determine whether the vehicle can pass. In such a situation, the remote operator operates the steering wheel, the accelerator, and the brake at his/her own discretion while watching the image on the display unit 19, and remotely controls the vehicle 21 so as to overtake the stopped vehicle when there is no oncoming vehicle. Further, the future path of the vehicle 21 based on the current steering angle of the steering wheel is illustrated as a remote operation guide 80 on the display unit 19 in FIG. 6. This is displayed as an auxiliary so that the remote operator can appropriately perform the remote control because the size and characteristics of the vehicle 21 remotely controlled by the remote operator are different, and the response is different for each vehicle even if the same operation is performed.

Further, although the case where the remote operator directly instructs the steering wheel, the accelerator, and the brake is illustrated here, a configuration in which only a part of these (for example, only the accelerator and the brake) are instructed by the remote operator may be adopted. A configuration may be used in which the remote operator instructs only departure/stop (or target speed) while making use of the autonomous movement function of the moving body control device 1. In this case, for example, the display unit 19 may be a touch panel type, and the operation information acquisition unit 17 may be configured to receive an operation input from a remote operator.

Next, an example of the operation of the moving body control system according to this embodiment will be described using FIGS. 7 to 9.

<First Specific Example of Operation of Moving Body Control System of this Embodiment>

Figure 7:
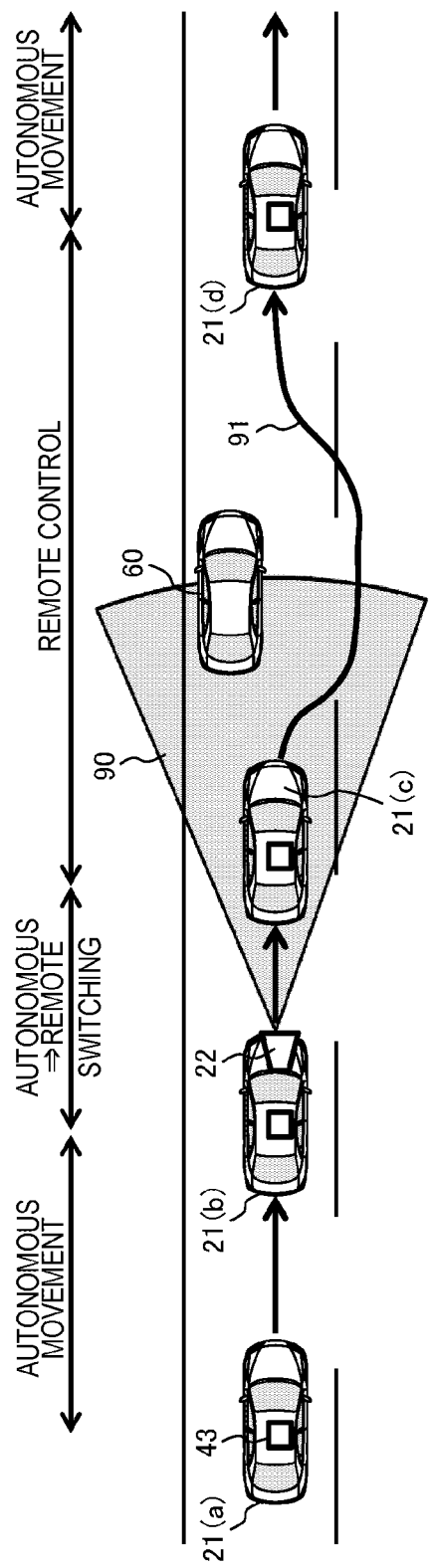
FIG. 7 is an explanatory diagram illustrating an operation example of the moving body control system according to the first embodiment.

FIG. 7 is a first specific example of an operation in which the control device 2 determines that the autonomous movement cannot be continued in the future during the autonomous movement and switches to the remote control in advance. Here, similarly to FIGS. 3 to 6, there is a stationary obstacle 60 (parking vehicle) on the path of the vehicle 21 that is moving autonomously, and it is necessary to pass over the center line. In a case where the detection range of the forward sensor 22 is short, the in-vehicle control device 1 cannot determine whether the vehicle 21 can pass the stationary obstacle 60 without obstructing the path of the oncoming vehicle. Therefore, the autonomous movement is stopped and the remote control is received from the remote operator. Hereinafter, the switching operation from the autonomous movement to the remote control and the overtaking operation after the remote control will be specifically described.

The vehicle 21 in the autonomous movement cannot detect the stationary obstacle 60 at the position of 21(*a*), but detects the stationary obstacle 60 when approaching 21(*b*). Further, here, the external information detection range 90 of the sensor 22 is illustrated in a fan shape. When the stationary obstacle 60 is detected and the control device 2 determines that the autonomous movement continuation of the vehicle 21 is not allowed, the control device 2 instructs the in-vehicle control device 1 to decelerate via the in-vehicle communication device 43 and requests switching from the autonomous movement to the remote control.

In this embodiment, when switching from the autonomous movement to the remote control, the vehicle 21 is decelerated by calculating the target speed 52 such that the vehicle stops at the position 21(*c*) in front of the stationary obstacle 60. However, it is not always necessary to stop at the position of 21(*c*), and if the remote operator determines that the vehicle can overtake from the image on the display unit 19, it may switch to the remote control during traveling, and may pass the stationary obstacle 60 by the control of the remote operator. On the other hand, in a case where it takes a long time to switch to the remote control, or in a case where the remote operator cannot determine the overtaking start due to the presence of an oncoming vehicle, the vehicle is temporarily stopped at 21(*c*) in front of the stationary obstacle 60. Then, after switching to the remote control according to the operation of the remote operator, the stationary obstacle 60 may be overtaken.

Then, when the vehicle 21 reaches the position 21(d) at which the vehicle 21 can return to the autonomous movement after passing the stationary obstacle 60, the autonomous mobility calculation unit 11 or the remote operator can determine the autonomous mobility again. In this case, the switching from the remote control to the autonomous movement is requested to the in-vehicle control device 1, and the autonomous movement is resumed by the in-vehicle control device 1.

<Second Specific Example of Operation of Moving Body Control System of this Embodiment>

Figure 8:
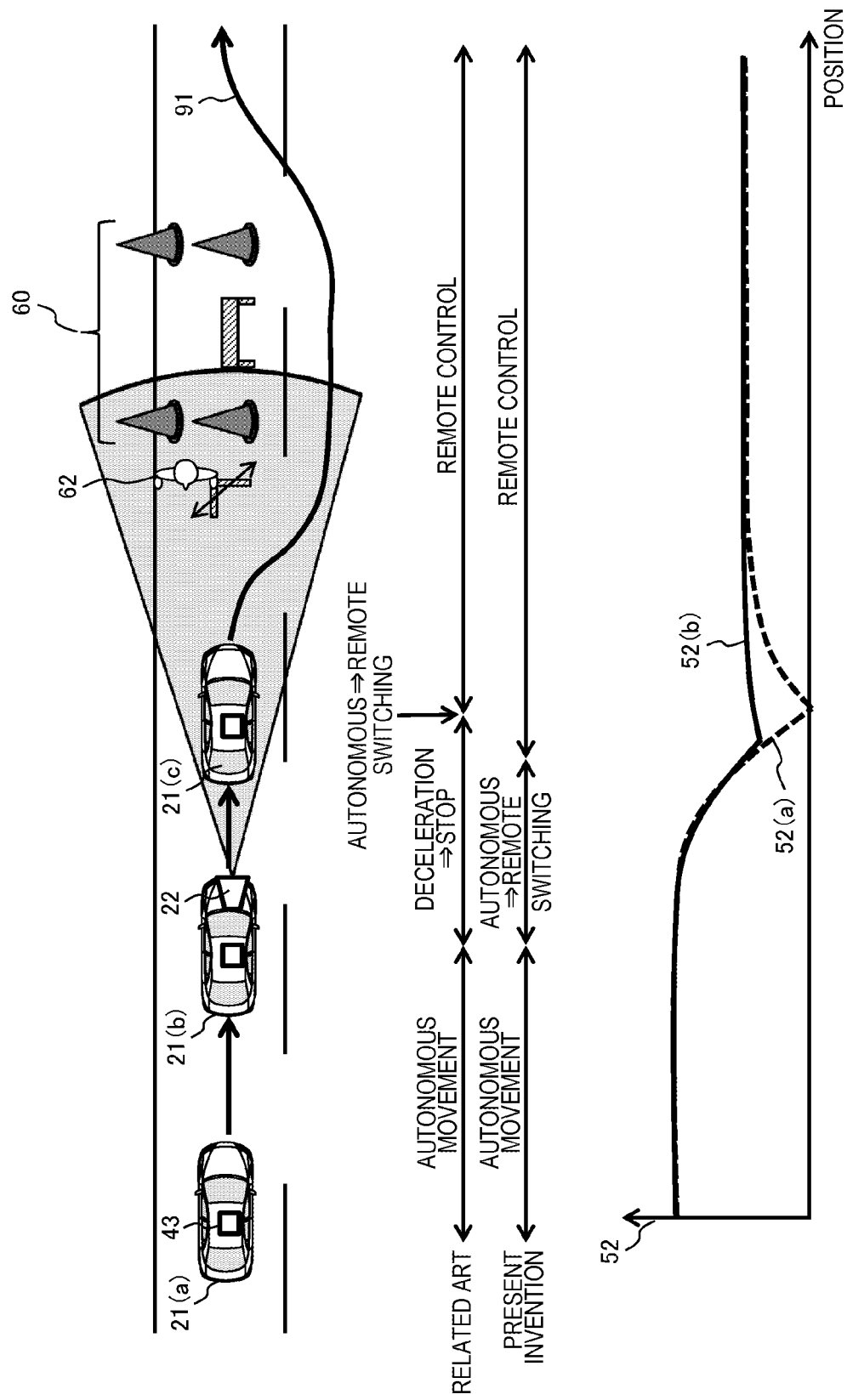
FIG. 8 is an explanatory diagram illustrating an operation example of the moving body control system according to the first embodiment.

FIG. 8 illustrates a second specific example of an operation in which the control device 2 determines that the autonomous movement continuation is not allowed in the future during the autonomous movement and switches to the remote control in advance. Here, there is a stationary obstacle 60 (construction site) on the path of the vehicle 21 that is moving autonomously, and it is necessary for the vehicle 21 to pass in accordance with the guidance of a traffic guide 62. In a case where the instruction of the traffic guide 62 cannot be determined by the ability of the sensor 22 in front, the in-vehicle control device 1 cannot determine whether to pass or stop, so it is necessary to stop the autonomous movement and receive the remote control by the control device.

The vehicle 21 in the autonomous movement cannot detect the stationary obstacle 60 and the traffic guide 62 at the position of 21(a), but detects the stationary obstacle 60 and the traffic guide 62 when approaching 21(b). When the stationary obstacle 60 and the traffic guide 62 are detected and the control device 2 determines that the autonomous movement continuation of the vehicle 21 is not allowed, the control device 2 instructs the in-vehicle control device 1 to decelerate via the in-vehicle communication device 43 and requests switching from the autonomous movement to the remote control.

In the related art, since whether the autonomous movement can be continued or not is determined on the in-vehicle control device 1 side, as illustrated by a target speed 52(a) in FIG. 8, the vehicle temporarily stops before the traffic guide 62 and switches to the remote control, and then it is necessary to make a new decision whether to leave or wait. On the other hand, in this embodiment, since the vehicle is remotely switched during movement, it is not always necessary to stop after the remote switching. If the remote operator can confirm the advance instruction of the traffic guide 62 at the stage of switching to the remote control, it is possible to pass as it is without stopping, as illustrated by the target speed 52(b) in FIG. 8. On the other hand, in a case where the switching to the remote control has not been completed before the vehicle stops, or in a case where the traffic guide 62 has given an instruction to stop, the vehicle stops according to the target speed 52(a) generated by the control unit 6 as it is, and moves by remote control according to the operation of a remote operator.

As described above, this embodiment is advantageous in that even in the case where the vehicle must be stopped in the related art, it is not always necessary to stop the vehicle, and the vehicle can pass smoothly.

<Third Specific Example of Operation of Moving Body Control System of this Embodiment>

Figure 9:
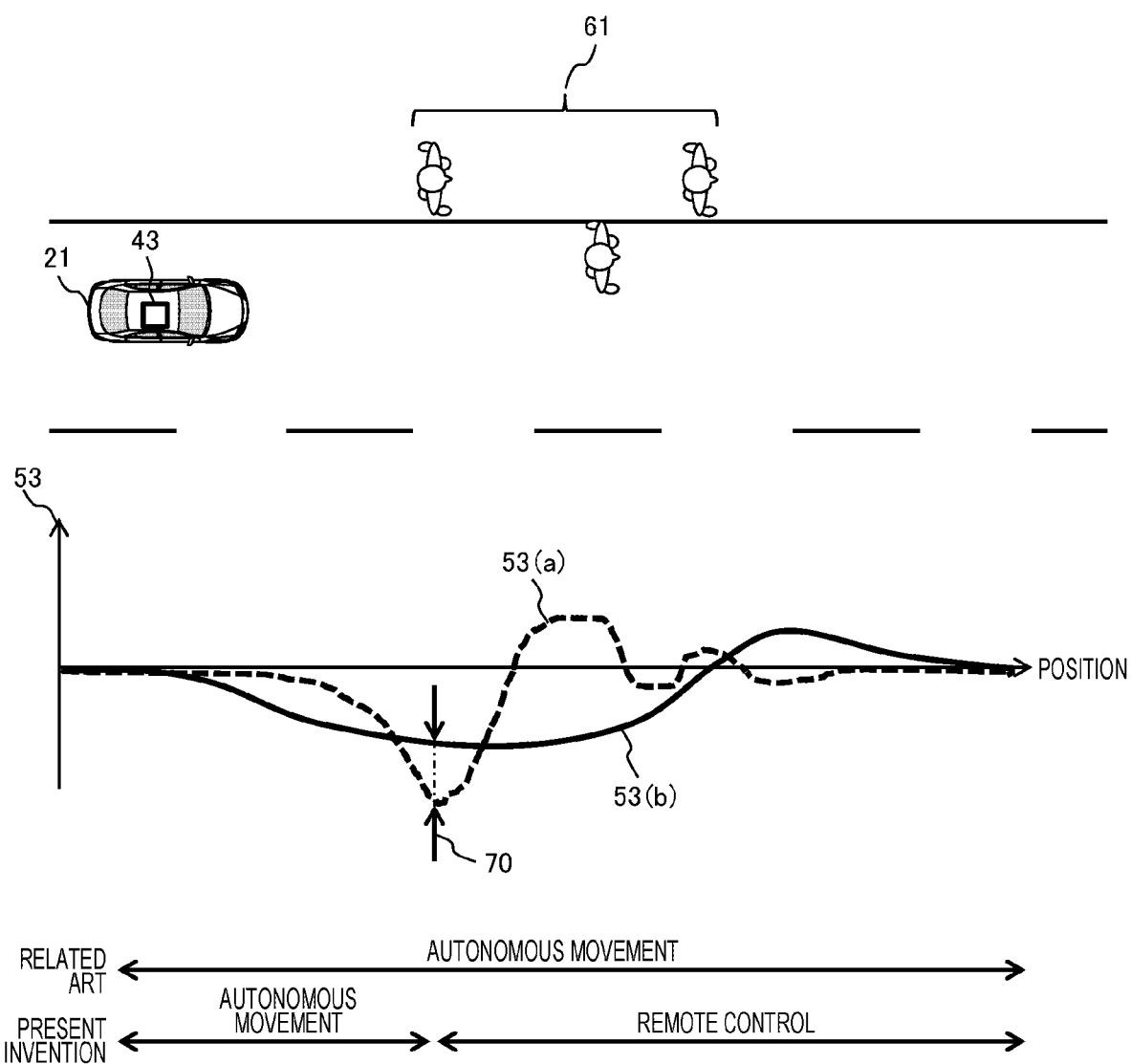
FIG. 9 is an explanatory diagram illustrating an operation example of the moving body control system according to the first embodiment.

FIG. 9 illustrates a third specific example of an operation in which the control device 2 determines that the autonomous movement continuation is not allowed during the autonomous movement and switches to the remote control in advance. In this case, there is a plurality of moving obstacles 61 (pedestrians) that partially interfere with the planned path of the vehicle 21 in front of the vehicle that is moving autonomously. At this time, the in-vehicle control device 1 acquires information such as the position, speed, moving direction, and size of the moving obstacle 61 as the external information 12. Then, the future movement direction of the moving obstacle 61 is predicted. In a case where future interference is expected, the speed is smoothly decelerated in advance, and even in a case where there is a sudden path change of the moving obstacle, the vehicle stops suddenly before contact. It travels autonomously while calculating the speed at which it can stop.

In general, as the number of moving obstacles 61 increases, the more computational power is required. However, in a case where the computational power of the in-vehicle control device 1 is not sufficiently high due to cost constraints or the like, the calculation in the control unit 6 cannot be performed in time, and as illustrated in FIG. 9, there is a scene where an acceleration target 53(a) suddenly decreases, and there is a possibility that control may be performed such that sudden braking is applied. Such an event may occur, for example, when the in-vehicle control device 1 omits the prediction of the behavior of a moving obstacle that is distant from the vehicle in order to omit the computational power, and there may be a scene that the moving obstacle causes a sudden change in behavior. In the related art, in a case where such a change in acceleration is not set as an abnormal value in advance, there is a possibility that autonomous movement may continue in a situation such as the acceleration target 53(a) where sudden braking occurs.

On the other hand, in this embodiment, the behavior prediction is also performed by the control device 2 using the same algorithm as that of the control unit 6. However, in the control device 2 having a high computational power, the target acceleration 53(b) can be calculated to make softer deceleration as illustrated in FIG. 9. In a case where a large deviation 70 is predicted between the target acceleration 53(b) and the target acceleration 53(a) calculated by the in-vehicle control device 1 in a situation where sudden braking occurs, the control device 2 can switch from the autonomous movement to the remote control, and the vehicle 21 can safely pass by a pedestrian under the control of the remote operator.

As described above, in the related art, there is a situation where the control of the vehicle 21 suddenly changes or becomes unstable without the abnormality being detected by the in-vehicle control device 1 side. However, in this embodiment, the remote control 2 can detect an abnormality of the vehicle 21, so that it is possible to switch from the autonomous movement to the remote control in an appropriate situation.

<Fourth and Fifth Specific Examples of Operation of Moving Body Control System of this Embodiment>

Figure 17:
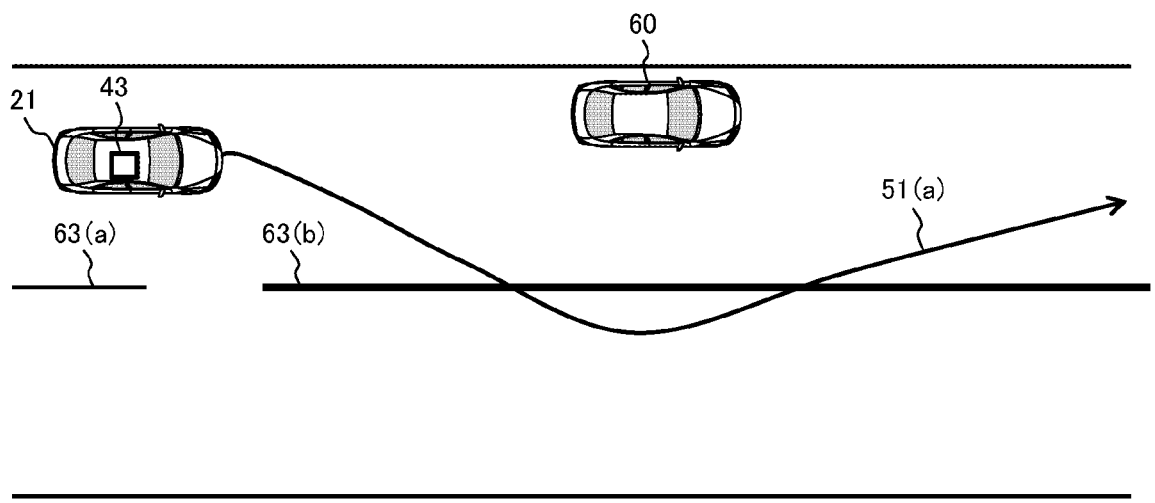
FIG. 17 is an explanatory diagram illustrating an example of a road condition at the time of switching to remote control in the first embodiment.
Figure 18:
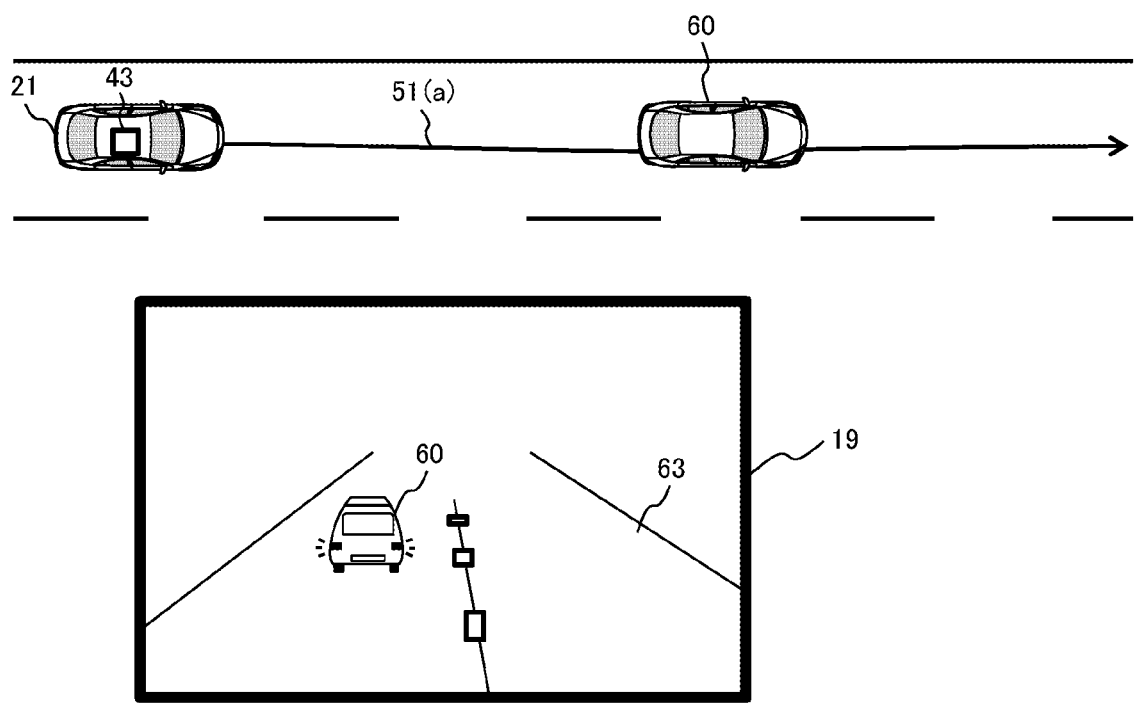
FIG. 18 is an explanatory diagram illustrating an example of a road condition at the time of switching to remote control in the first embodiment.

In addition to the examples of FIGS. 7 to 9, the autonomous movement may be switched to the remote control in the situations of FIGS. 17 and 18.

FIG. 17 illustrates a situation where a stationary obstacle 60 (illustrated here as a parked vehicle) exists on the path of the vehicle 21 and overtaking is required beyond the center line, similarly to FIG. 7. However, the center line has been changed from a broken line 63(a) capable of passing over to a solid yellow line 63(b), which is prohibited from passing over, and thus it is a situation that the line is prohibited to be passed over under traffic regulations in principle. However, depending on the size of the stationary obstacle 60, it is necessary for the vehicle to pass over the lane of the solid yellow line. As for the in-vehicle control device 1 that is set to comply with the traffic regulations, it is difficult to determine how to autonomously move. Therefore, in a case where such a situation occurs, the control is switched to the remote control so as to overtake the stationary obstacle 60 under the responsibility of the remote operator.

In addition, FIG. 18 illustrates a scene in which it is difficult to determine whether the stationary obstacle 60 stopped in the center of the lane ahead of the vehicle is a preceding vehicle stopped in a traffic jam or a parked vehicle stopped at an abnormal position, and the in-vehicle control device 1 cannot determine whether to pass. Also in this case, the in-vehicle control device 1 tentatively recognizes the stationary obstacle 60 as the preceding vehicle and stops, and then in a case where the preceding vehicle has not moved even after the predetermined time has elapsed, the control is switched to the remote control, and in response to the operation of the remote operator, any appropriate action of stop continuation or overtaking is executed.

As described above, according to the moving body control system of this embodiment, it is possible to switch from the autonomous movement to the remote control before the vehicle stops, so it is not always necessary to stop the vehicle depending on road conditions, and smoother operation is possible.

In addition, even in a case where the performance of the in-vehicle control device is suppressed and the in-vehicle device cannot properly detect the vehicle abnormality, the control device can properly detect the vehicle abnormality and switch from the autonomous movement to the remote control appropriately.

Second Embodiment

Next, a second embodiment of the present invention will be described using FIGS. 10 to 13. Further, the description of the same parts as in the first embodiment will be omitted.

In the control device 2 according to the first embodiment, as illustrated in FIG. 2 and the like, the vehicle 21 is controlled using the external information 12 acquired by the vehicle 21. However, in a case where the control device 2 controls a large number of vehicles and fixed-point observation cameras, the vehicle 21 can be controlled using external information acquired by a vehicle other than the vehicle 21 to be controlled.

Therefore, in the control device 2 of this embodiment, external information from a large number of vehicles and fixed-point observation cameras and the like is also acquired, and when controlling the desired vehicle 21, the external information acquired by other vehicles and the like is simultaneously used, so switching to more reliable and smooth remote control can be realized.

Figure 10:
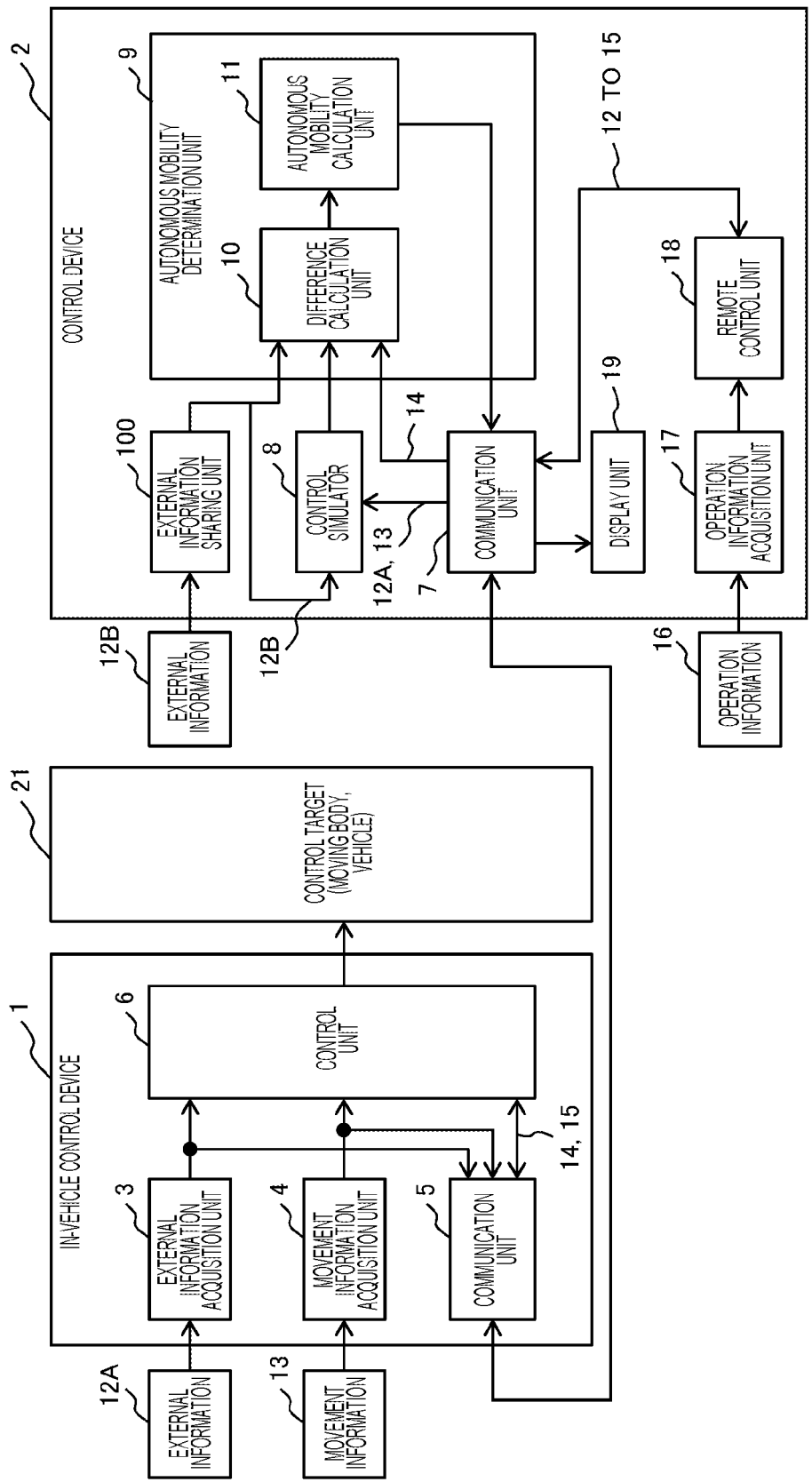
FIG. 10 is an explanatory diagram illustrating an overall configuration of a moving body control system according to a second embodiment.

FIG. 10 is a functional block diagram illustrating the configuration of the moving body control system according to the second embodiment, which differs from FIG. 2 of the first embodiment in that an external information sharing unit 100 is added. Further, in FIG. 10, the external information acquired by the in-vehicle control device 1 of the vehicle 21 to be controlled is referred to as external information 12A, and the external information acquired by the vehicles other than the vehicle 21 to be controlled or fixed-point observation cameras and input to the external information sharing unit 100 is referred to external information 12B. Hereinafter, the details of FIG. will be described focusing on that the external information 12B is involved.

The control simulator 8 simulates the operation (calculation) of the control unit 6 of the in-vehicle control device 1. In other words, in addition to the external information 12A and the movement information 13 acquired via the communication unit 7, the external information 12B acquired by the external information sharing unit 100 is used, so that a travel plan is calculated using the same means (algorithm) as the control unit 6 of the in-vehicle control device 1, and the operation of the vehicle 21 to be controlled is determined based on this travel plan. Then, a control command value of each actuator mounted on the vehicle 21 is calculated so as to realize this operation.

The autonomous mobility determination unit 9 compares the internal information 14 of the in-vehicle control device 1 with the control command value of each actuator calculated by the control simulator 8 and the internal calculation value, and determines whether the vehicle 21 to be controlled can continue autonomous movement. This process is the same as that of the first embodiment, but in this embodiment, the external information 12A is compared with the external information 12B, and the comparison result may also be used for determining whether the autonomous movement can be continued. Further, the movement information 13 from the in-vehicle control device 1 is compared with the information on the movement of the vehicle 21 included in the external information 12B, and the comparison result may also be used for determining whether the autonomous movement can be continued.

The difference calculation unit 10 calculates a difference between the internal information 14 and a control command value of each actuator calculated by the control simulator 8 or an internal calculation value. Specifically, a travel plan (a target traveling trajectory, a target speed, and the like), a control command value of each actuator, a variable value during calculation, a constant value, and the like are targets of deviation calculation. This processing is the same as that of the first embodiment, but in this embodiment, a difference between the external information 12A and the external information 12B may be calculated. Although details will be described later, the position, size, attribute, and the like of the stationary obstacle and the moving obstacle included in both external information are targets of the deviation calculation. Further, deviations may be calculated in the information such as the current position, the traveling angle, and the speed included in the movement information 13 from the in-vehicle control device 1 and the information such as the current position, the traveling angle, and the speed of the vehicle 21 detected from the external information 12B.

Figure 11:
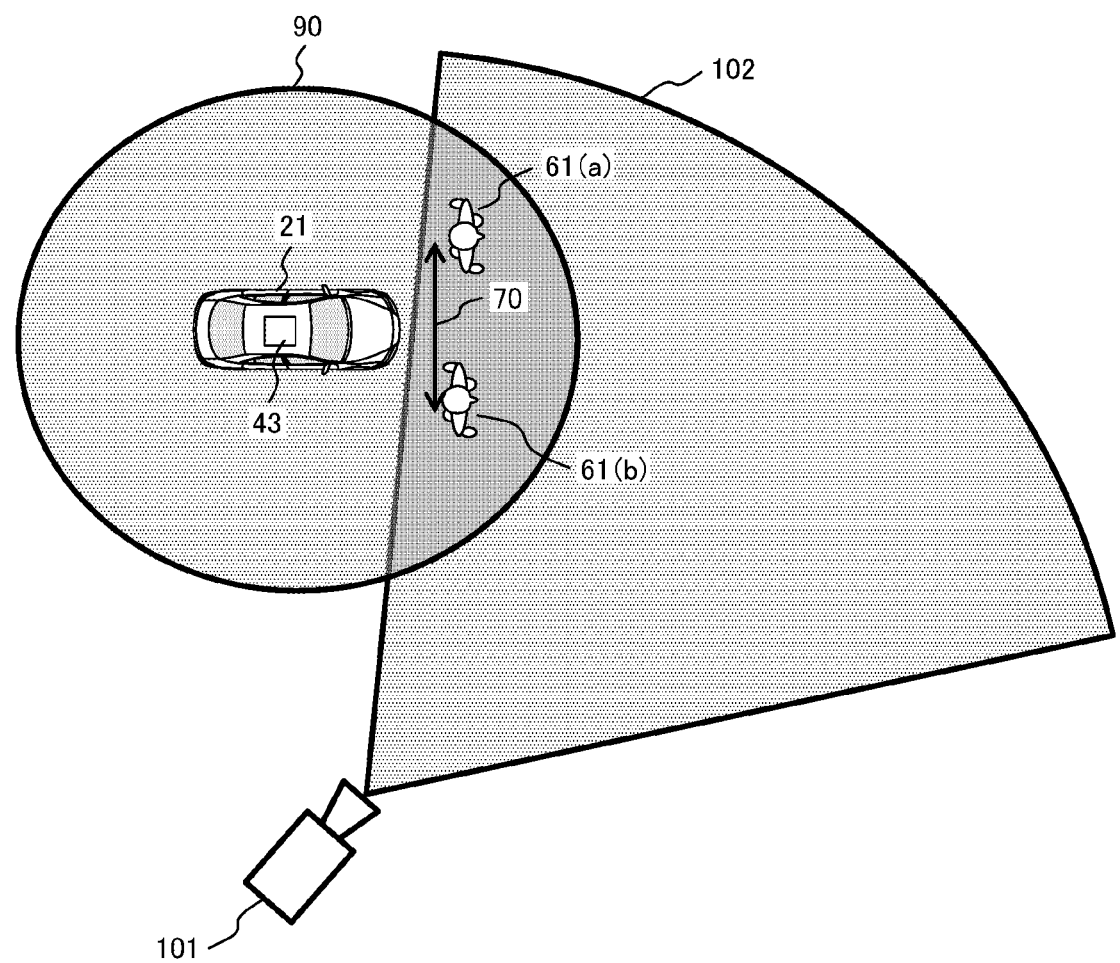
FIG. 11 is an explanatory diagram illustrating an example of calculating a deviation of external information in the second embodiment.

Next, an example of a deviation calculation process between the external information 12A and the external information 12B will be described using FIG. 11. FIG. 11 illustrates the vehicle 21 to be controlled and a moving obstacle 61 (pedestrian) existing in front of the vehicle 21. Since the pedestrian exists within the detection range 90 of the vehicle 21, the information indicating the moving obstacle 61(a) can be acquired from the external information 12A of the in-vehicle control device 1. In addition, since the pedestrian exists in a detection range 102 of the fixed-point observation camera 101 (or 3D sensor) installed on the road side, the information indicating the moving obstacle 61(b) can be acquired from the external information 12B of the fixed-point observation camera 101.

At this time, the difference calculation unit 10 compares the information on the moving obstacle 61(a) and the information on the moving obstacle 61(b), and determines whether the moving obstacle 61 is the same object based on the size, the attribute value, and the like. Then, after determining that they are the same object, a deviation 70 between the two positions is calculated.

In a case where the deviation 70 becomes equal to or larger than a predetermined value, it is considered that there is a possibility that an error has occurred in the external information acquisition unit 3 of the vehicle 21 or that the own vehicle position included in the movement information 13 has been deviated. In this case, since the continuation of the autonomous movement may be adversely affected, the control device 2 needs to determine that the autonomous movement continuation is not allowed and switch from the autonomous movement to the remote control.

Therefore, the autonomous mobility calculation unit 11 of the control device 2 determines that the autonomous movement cannot be continued in a case where the deviation 70 equal to or more than the predetermined value is input, and commands the in-vehicle control device 1 to switch to the remote control via the communication unit 7.

In addition, using FIGS. 12A and 12B, an example of a deviation calculation process of the own position of the vehicle 21 acquired from the movement information 13 of the vehicle 21 to be controlled and the own position of the vehicle 21 acquired from the external information 12B will be described.

Figure 12A:
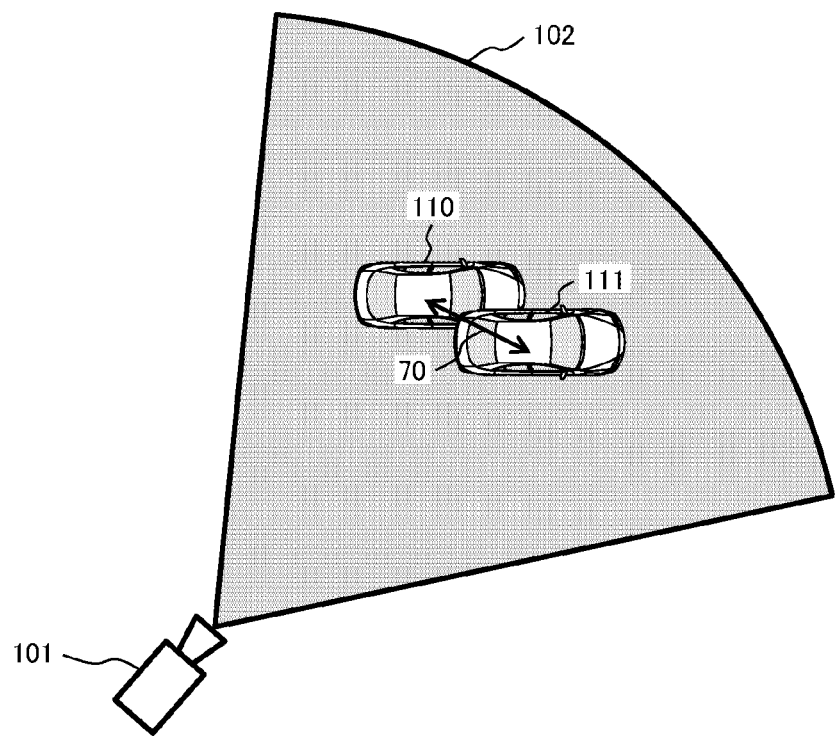
FIG. 12A is an explanatory diagram illustrating an example of calculating a deviation of the own position of the own vehicle based on a fixed-point observation camera in the second embodiment.

FIG. 12A illustrates a situation where the vehicle 21 exists within the detection range 102 of the fixed-point observation camera 101 (or the 3D sensor), and the vehicle is controlled using the external information 12B obtained from the fixed-point observation camera 101. In this case, the deviation 70 can be obtained as a difference between the own position 110 of the vehicle 21 included in the movement information 13 and the own position 111 of the vehicle 21 detected by the fixed-point observation camera 101. The difference calculation unit 10 calculates and transmits the deviation 70 to the autonomous mobility calculation unit 11. For the continuation of the autonomous movement, it is important that the in-vehicle control device 1 can accurately detect or estimate the own position, and in a case where there is an error in the own position, there may be some trouble. Therefore, the autonomous mobility calculation unit 11 determines that the autonomous movement cannot be continued in a case where the deviation 70 becomes equal to or larger than a predetermined value.

Figure 12B:
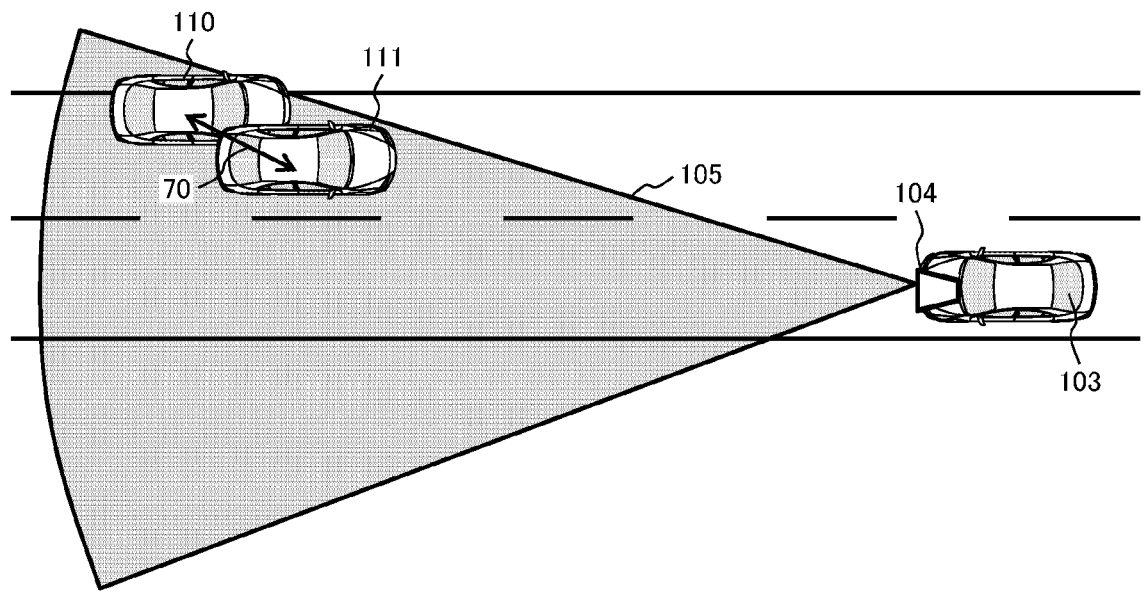
FIG. 12B is an explanatory diagram illustrating an example of calculating a deviation of the own position of the own vehicle based on an external information acquisition unit of another moving body in the second embodiment.

On the other hand, FIG. 12B illustrates a situation where the vehicle 21 exists within the detection range 105 of the sensor 104 (the external information acquisition unit) of the other moving body 103, and the vehicle 21 is controlled using the external information 12B obtained from the sensor 104. In this case, similarly to FIG. 12A, the difference calculation unit 10 calculates the deviation 70 between the own position 110 of the vehicle 21 included in the movement information 13 and the own position 111 of the vehicle 21 detected by the sensor 104. The autonomous mobility calculation unit 11 determines that the autonomous movement cannot be continued in a case where the deviation 70 is equal to or larger than a predetermined value.

Next, an example will be described using FIG. 13 in which, before the external information acquisition unit 3 of the vehicle 21 detects an object, determination is made in advance that autonomous movement in the future cannot be continued, using the external information 12B, and switches to remote control.

Figure 13:
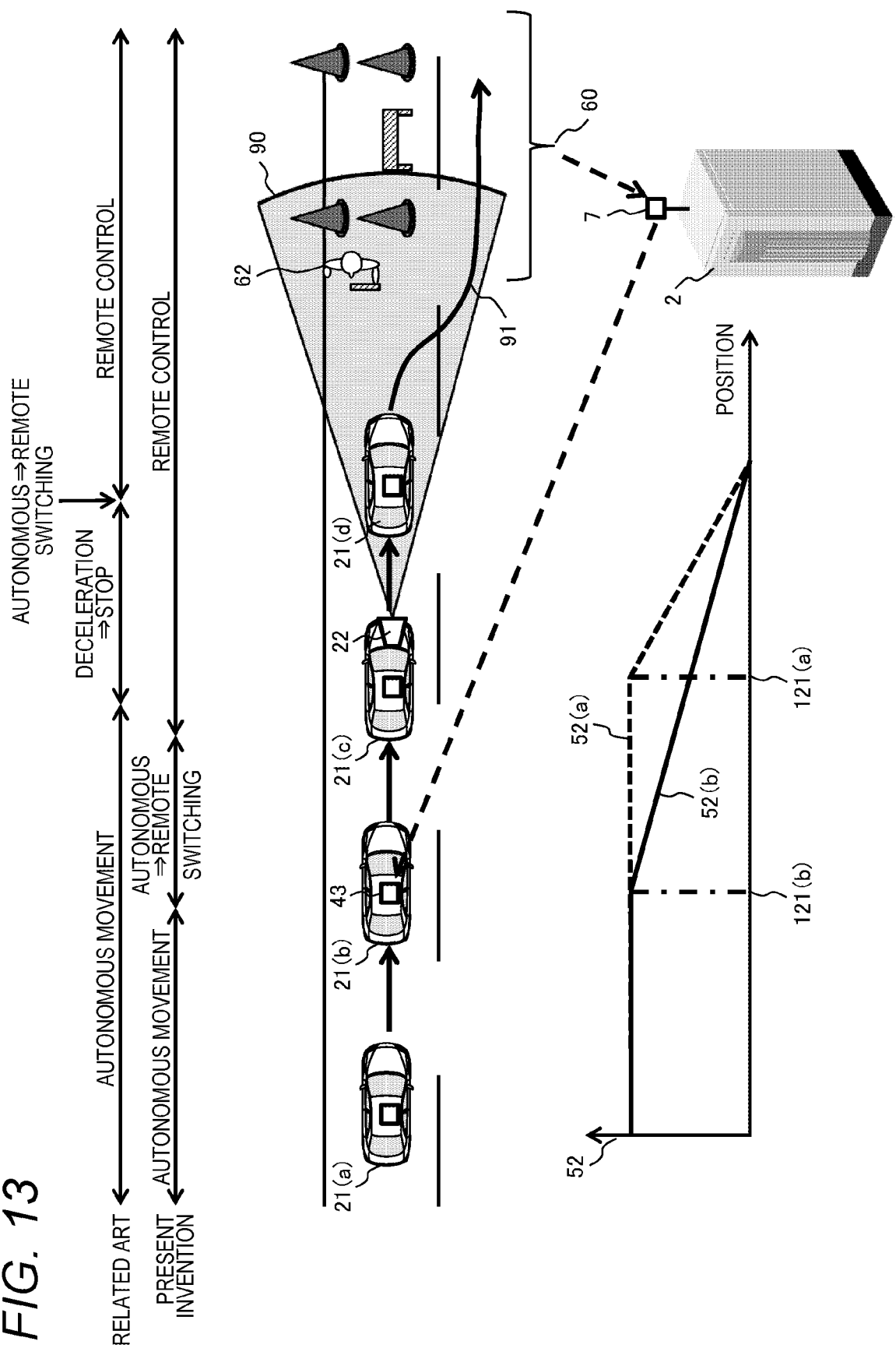
FIG. 13 is an explanatory diagram illustrating an operation example of the moving body control system according to the second embodiment.

FIG. 13 illustrates a situation where a stationary obstacle 60 (construction site) exists on the path of the vehicle 21 that is moving autonomously, and the vehicle 21 needs to travel in accordance with the guidance of the traffic guide 62. In a case where the instruction of the traffic guide 62 cannot be determined by the ability of the sensor 22 in front, the in-vehicle control device 1 cannot determine whether to pass or stop, so it is necessary to stop the autonomous movement and receive the remote control by the control device.

At the position 21(b), the stationary obstacle 60 cannot be detected by the sensor 22 of the vehicle 21. However, the external information 12B already held by the control device 2 includes information on the stationary obstacle 60. Therefore, the control device 2 can predict that the autonomous movement cannot be continued in a case where the vehicle 21 proceeds as it is. Then, when vehicle approaches 21(b), the control device 2 transmits a switching command to remote control based on the determination that the autonomous movement cannot be continued.

In FIG. 8 of the first embodiment, the stationary obstacle 60 and the traffic guide 62 are detected when the vehicle 21 approaches 21(c). Then, since it is determined that the autonomous movement cannot be continued after this position, the vehicle decelerates from a deceleration start point 121(a) as illustrated in 52(a) in the lower diagram of FIG. 13. On the other hand, in this embodiment, as illustrated in 52(b), since the speed can be reduced from the deceleration start point 121(b) before the deceleration start point 121(a), it is possible to make the speed change (deceleration) smoother.

As described above, according to the moving body control system of this embodiment, it is possible to switch to the remote control in advance as compared with the related art, and thus the deceleration start point can be set earlier. In addition, it is possible to detect that an error has occurred not only in the control unit 6 but also in the external information acquisition unit 3 and the movement information acquisition unit 4, and it is possible to switch to more robust autonomous movement and more reliable remote control.

Third Embodiment

Next, a third embodiment of the present invention will be described using FIGS. 14 to 16. Further, the description of the same parts as those in the above-described embodiment is omitted.

The autonomous mobility determination unit 9 of the first and second embodiments uses the difference calculation unit 10 and the autonomous mobility calculation unit 11 to determine that the autonomous movement cannot be continued. In contrast, in this embodiment, the external information 12A, the movement information 13, and the internal information 14 from the moving body control device are compared with the information calculated in the control device 2 or the shared external information 12B. Then, the autonomous movement continuity is determined based on the deviation. For example, a configuration may be adopted in which a remote operator operating the control device 2 compares the external information 12 with the recognition result and determines whether there is an error in the vehicle 21, that is, whether autonomous movement can be continued.

Figure 14:
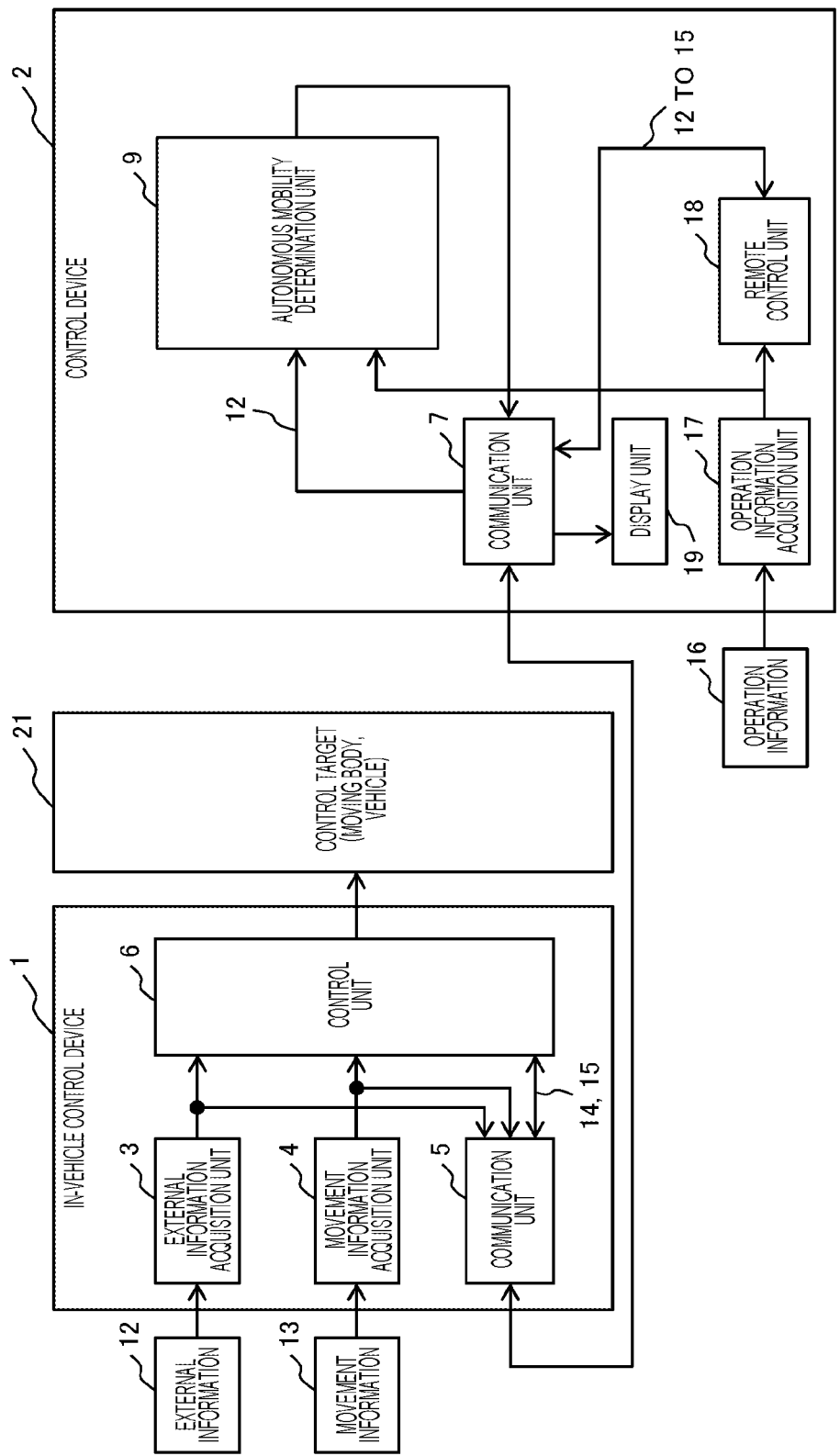
FIG. 14 is an explanatory diagram illustrating an overall configuration of a moving body control system according to a third embodiment.

FIG. 14 is a functional block diagram illustrating the configuration of the moving body control system according to this embodiment, in which the difference calculation unit 10 and the autonomous mobility calculation unit 11 are omitted. The third embodiment differs from the first and second embodiments in that the output signal of the operation information acquisition unit 17 is input to the autonomous mobility determination unit 9. In the following, a point at which the remote operator is involved in the determination by the autonomous mobility determination unit 9 is extracted via the operation information acquisition unit 17, and details of FIG. 14 will be described.

The operation information acquisition unit 17 is operated by the remote operator, is a unit for inputting operation information 16 for remotely controlling the vehicle 21, and also is a unit for inputting the result of the autonomous movement continuity determination based on the reliability of the recognition information of the external information 12 and the remote operator's own determination.

The autonomous mobility determination unit 9 determines whether the autonomous movement can be continued based on the operation information 16 of the remote operator. Similarly to the first and second embodiments, the determination result is calculated to be 0 (autonomous movement continuation is not allowed), or 1 (autonomous movement continuation is allowed) as an example. A continuous value such as a reliability may be calculated based on the operation information 16 of the remote operator. The calculated autonomous movement continuity is transmitted to the in-vehicle control device 1 via the communication unit 7 as a part of the remote control information 15.

The display unit 19 is a unit for displaying information necessary for the remote operator to input the operation information 16 for remote control, and uses a display, a tablet terminal, or the like. From the information of the display unit 19, the remote operator checks the state of the vehicle 21 in which autonomous movement cannot be continued or the surrounding situation, and remotely controls the vehicle 21 or inputs an instruction to assist the control as operation information 16. In addition, by displaying a screen for comparing the raw information of the sensor 22 and the recognition result of the external information 12, the remote operator can determine whether to continue the autonomous movement by comparing these.

Figure 15A:
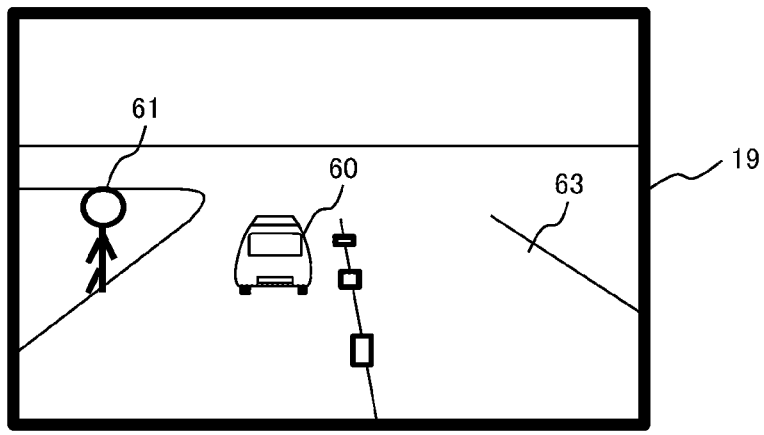
FIG. 15A is an explanatory diagram illustrating an example of a front image displayed on a display unit in the third embodiment.
Figure 15B:
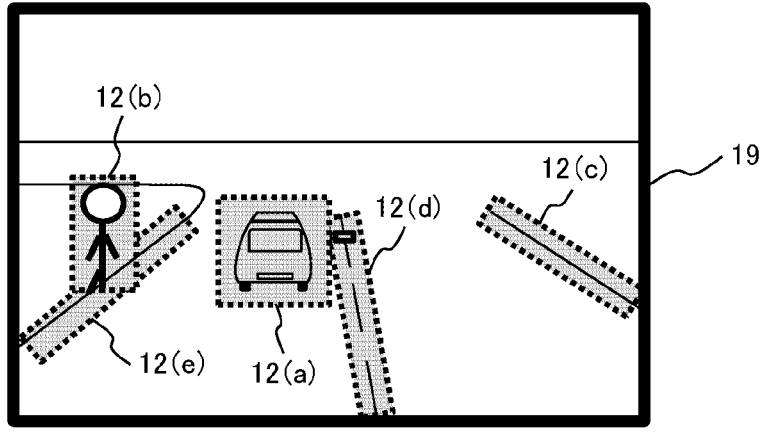
FIG. 15B is an explanatory diagram when a recognition result added to the front image in FIG. 15A is normal.
Figure 15C:
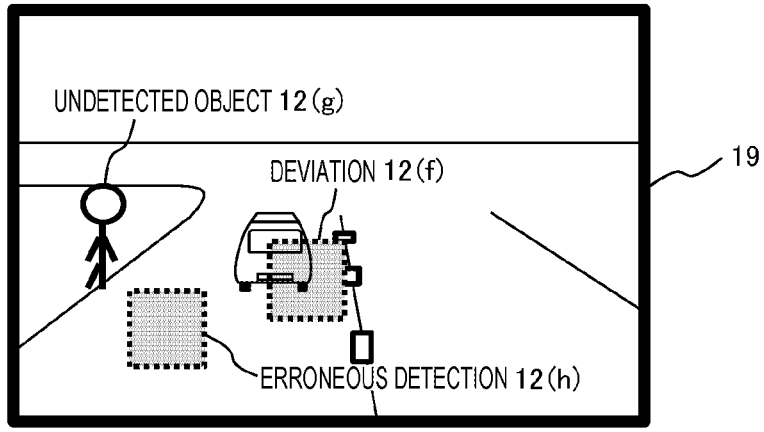
FIG. 15C is an explanatory diagram when the recognition result added to the front image in FIG. 15A is abnormal.

FIGS. 15A to 15C illustrate examples of the operation information acquisition unit 17 and the display unit 19. In this drawing, the display unit 19 displays the front image acquired by the remote operator from the sensor 22 and the external information recognition result acquired by the external information acquisition unit 3 in a superimposed manner. This screen is of a touch panel type, for example, and also serves as the operation information acquisition unit 17. Alternatively, the operation information acquisition unit 17 may be an input device such as a keyboard or a mouse, a control panel, or the like.

First, FIG. 15A is a front image captured by the sensor 22 mounted in front of the vehicle 21.

FIG. 15B illustrates the recognition result of the external information 12 superimposed on FIG. 15A. The broken line represents the object detected by the external information acquisition unit 3 and overlaps with the stationary obstacle 60, the moving obstacle 61, the road surface paint 63, etc., and the preceding vehicle 12(a), the pedestrian 12(b), the white line on the right side 12(c), a center line 12(d), and a left white line 12(e) are displayed. As illustrated in FIG. 15B, in a case where most of the objects that can be viewed by the remote operator can be obtained as the external information 12, there is no problem even if the autonomous movement is continued, so the remote operator inputs the determination that the autonomous movement can be continued, or inputs nothing.

On the other hand, as illustrated in FIG. 15C, in a case where there are a number of errors in the detection result of the external information acquisition unit 3, such as the deviation 12(f) of the detection range of the object, the undetected object 12(g), and the erroneous detection of the non-existent object 12(h), the remote operator determines that some error has occurred in the external information acquisition unit 3 and determines that autonomous movement continuation is not allowed. In this case, the remote operator issues an instruction to switch to the remote control from the operation information acquisition unit 17. Alternatively, a configuration may be employed in which the autonomous mobility determination unit 9 determines whether to continue the autonomous movement based on a deviation from the detection result by inputting an actual recognition result on the screen to be drawn.

Figure 16A:
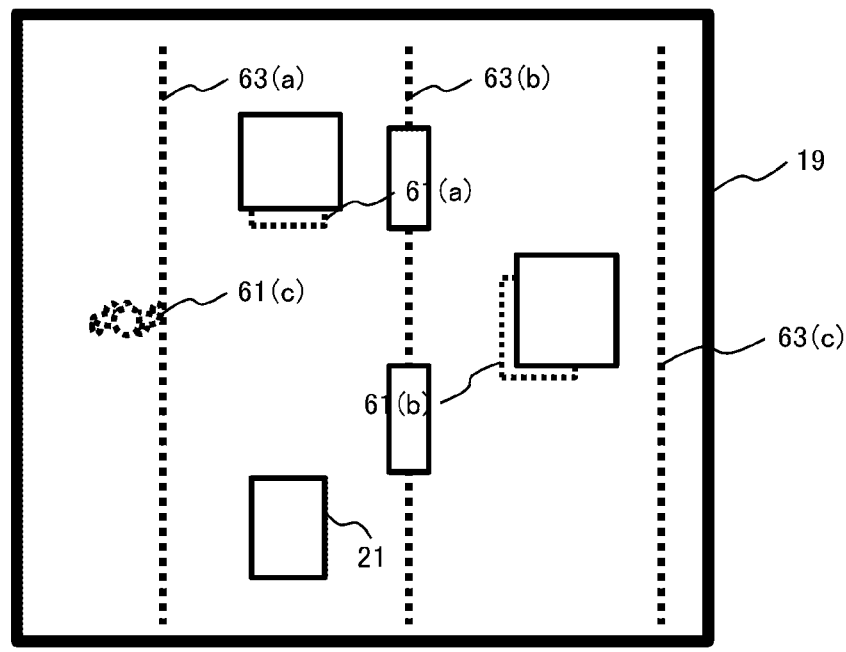
FIG. 16A is an explanatory diagram illustrating an example of 3D point group information displayed on the display unit according to the third embodiment.
Figure 16B:
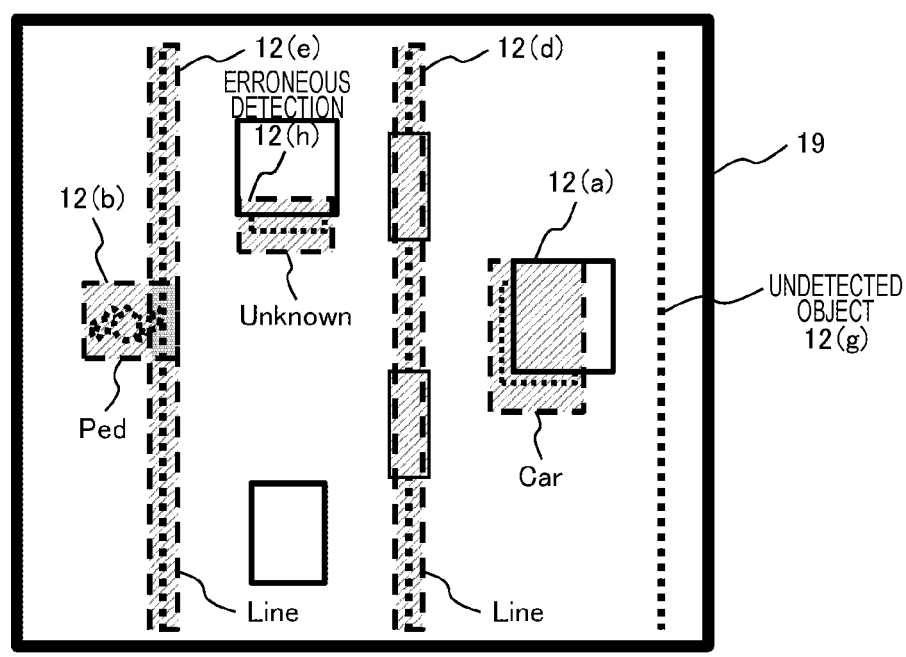
FIG. 16B is an explanatory diagram illustrating an example in which a recognition result is added to the 3D point group information of FIG. 16A.

FIGS. 16A and 16B illustrate a case where the sensor 22 is a sensor such as LiDAR that acquires a 3D point group. The position of the vehicle 21 is drawn below the display unit 19, and the 3D shape of the object ahead of the vehicle 21 is indicated by a point group. FIG. 16A illustrates the original image, for example, a preceding vehicle 61(a), an oncoming vehicle 61(b), a pedestrian 61(c), a left white line 63(a), a center line 63(b), a right white line 63(c) are visible to the eyes of the remote operator. However, since the area behind the shield cannot be seen in the point group information, only a part of the point group information may be seen, for example, as in the preceding vehicle 61(a).

FIG. 16B illustrates an example in which information of the recognition result is added. Here, similarly to FIG. 15, the area surrounded by the broken line is the area in which the external information acquisition unit 3 has detected the object, and the attribute (vehicle, pedestrian, line, etc.) estimated value is also displayed in a superimposed manner. From such images, for example, the recognition error such as the remote operator views as an unknown object instead of a car (erroneous detection 12(h)), and the white line on the right side has not been detected (undetected 12(g)) can be confirmed. In a case where there are a large number of such recognition errors, the remote operator determines that some error has occurred in the external information acquisition unit 3, and determines that autonomous movement continuation is not allowed, as in the method described above.

As described above, according to the moving body control system of this embodiment, it is possible to reliably detect through the remote operator that an error has occurred in the external information acquisition unit 3, and to switch to a more robust autonomous movement and the remote control.

As described above, examples of the road conditions in which the autonomous movement continuation is not allowed are described in the first to third embodiments. First, FIG. 7 has described a case where the stationary obstacle 60 (illustrated here as a parked vehicle) exists on the course of the vehicle 21 and overtaking beyond the center line is required. At this time, in a case where the detection range of the sensor 22 is short, the vehicle 21 cannot determine whether the vehicle 21 can pass the stationary obstacle 60 without obstructing the oncoming vehicle, and stops the autonomous movement and receives the remote control by the control device.

Next, FIG. 8 has described a case where the construction site exists as a stationary obstacle 60 on the path of the vehicle 21 and the vehicle passes over the center line according to the guidance of the traffic guide 62. At this time, in a case where the instruction of the traffic guide cannot be determined based on the ability of the sensor 22, the vehicle 21 cannot determine whether to pass or stop, stops the autonomous movement, and receives the remote control by the control device.

Further, FIG. 9 has described a case where a situation where the performance of the in-vehicle control device is suppressed, such as a case where many moving obstacles exist in front of the vehicle 21, occurs. At this time, in the related art, the control may suddenly change or become unstable as a result without the abnormality being detected by the in-vehicle control device, whereas in this embodiment, it is possible to switch appropriately to the remote control since the abnormality can be appropriately detected by the remote device.

As described above, there are a plurality of scenes that can be switched to the remote control. However, the present technology is not limited to a specific scene, but can be applied to any scene where continuation of autonomous movement becomes difficult.

In addition, in the first to third embodiments described above, the automatic driving of the vehicle has been described as an example of the travel control, but the travel control is not limited to the automatic driving. The present invention is applicable to various forms of travel control such as inter-vehicle distance control (active cruise control), lane keeping, and automatic driving levels 2 to 5.

In the above-described first to third embodiments, a car has been described as an example. However, the present invention is applicable to any device that moves autonomously. For example, it can be applied to construction machines that perform autonomous movement (mine dump trucks, etc.), autonomous mobility (autonomous self-driving buses, single-seat small cars, golf carts, motorcycles, inverted pendulum type mobility, etc.), autonomous mobile robots, etc.

Further, the present invention is not limited to the above embodiments, but various modifications may be contained. For example, the above-described embodiments of the present invention have been described in detail to facilitate understanding, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

REFERENCE SIGNS LIST 1 in-vehicle control device
2 control device
3 external information acquisition unit
4 movement information acquisition unit
5, 7 communication unit
6 control unit
8 control simulator
9 autonomous mobility determination unit
10 difference calculation unit
11 autonomous mobility calculation unit
12, 12A, 12B external information
13 movement information
14 internal information
15 remote control information
16 operation information
17 operation information acquisition unit
18 remote control unit
19 display unit
22 vehicle
22, 23, 24, 25, 104 sensor
26 steering wheel
27 steering torque detection device
28 steering control device
29 motor
30 steering control mechanism
32 brake pedal
33 brake control mechanism
34 combine sensor
35 brake control device
37 accelerator pedal
38 stroke sensor
39 drive control device
40 drive control mechanism
41 steering wheel angle detection device
43 in-vehicle communication device
44 display device
60 stationary obstacle
61 moving obstacle
62 traffic guide
70 deviation
100 external Information sharing unit
101 fixed-point observation camera
103 other moving body

The invention claimed is:
1. A moving body control system, comprising:
a moving body control device that controls a moving body; and
a control device that controls the moving body from a remote place,
wherein the moving body control device is configured to:
obtain external information around the moving body,
acquire movement information of the moving body,
receive remote control information from the control device,
calculate a control amount for controlling a movement of the moving body based on at least one of the external information and the movement information,
switch an autonomous movement and a remote control of the moving body based on the remote control information received from the control device, and
transmit at least one of the external information, the movement information, and the control amount to the control device, and
wherein the control device is configured to:
receive at least one of the external information, the movement information, and the control amount from the moving body control device,
transmit the remote control information to the moving body control device,
receive second external information from an external sensor,
determine whether a first object externally located within a detection range of the moving body and a second object externally located within the detection range of the moving body are the same object based at least in part on the external information and the second external information,
based at least in part on a determination of whether the first object and the second object are the same object, determine an autonomous mobility of the moving body in the future, the autonomous mobility including a target acceleration calculated based on the determination of whether the first object and the second object are the same object, and
generate the remote control information including switching to a remote control in response to a determination that a deviation between the target acceleration and an initial target acceleration is larger than a predetermined value.

2. The moving body control system according to claim 1, wherein the control device is further configured to simulate a simulated control amount based on the external information and the movement information, and
determine an autonomous mobility based on a deviation between the simulated control amount and the control amount obtained from the moving body control device.

3. The moving body control system according to claim 2, wherein the control device is further configured to compare at least one of a target traveling trajectory, a target speed, and a target acceleration of the moving body in the control amount acquired from the moving body control device, with the simulated control amount, and
in response to a determination that a deviation is equal to or more than a predetermined value, the control device is further configured to determine that the autonomous movement is not allowed.

4. The moving body control system according to claim 1, wherein the control device is further configured to:
acquire operation information based on an operation of a remote operator, and
calculate a remote control amount for remotely controlling a movement of the moving body based on at least one of the operation information, the external information, and the movement information, and
wherein the moving body control device is further configured to determine the control amount using a part or all of the remote control amount during remote control.

5. The moving body control system according to claim 4, wherein the moving body control device is further configured to calculate the control amount for controlling the movement of the moving body based on at least one of the external information and the movement information, and
wherein the control device is further configured to determine that the autonomous movement is not allowed based on the external information and the movement information, in response to a determination that a deviation between at least one of the control amount or the calculated remote control amount and the control amount acquired from the moving body control device is equal to or more than a predetermined value.

6. The moving body control system according to claim 1, wherein the moving body control device switches between the autonomous movement and the remote control during traveling, based on a determination on whether a future autonomous movement obtained from the control device is allowed.

7. The moving body control system according to claim 1, wherein the control device is further configured to:
acquire and store the second external information from another moving body and a sensing device installed on a road, and
determine that the autonomous movement is not allowed in response to a determination that a deviation between the external information acquired by the moving body control device and the second external information stored in the control device is equal to or more than a predetermined value.

8. The moving body control system according to claim 7, wherein the control device is further configured to determine that the autonomous movement is not allowed in response to a determination that a deviation between an own position in internal information of the moving body control device and an own position of the moving body stored in the control device is the predetermined value or more.

9. The moving body control system according to claim 7, wherein the moving body control device is further configured to start deceleration before the control device detects a situation that causes the autonomous movement to be disabled, based on the remote control information received from the control device.

10. The moving body control system according to claim 7, wherein the moving body control device is further configured to switch to the remote control before the moving body control device detects a situation that causes the autonomous movement to be disabled, based on the remote control information received from the control device.

11. The moving body control system according to claim 1, wherein the control device is further configured to
display the external information to a remote operator, and
input operation information that is an input result including the external information, the second external information or autonomous mobility determination result recognized by the remote operator, and
wherein the control device determines an autonomous mobility based on operation information of the remote operator.

12. The moving body control system according to claim 11, wherein the control device is further configured to display image information from a camera installed on the moving body, and a recognition result of the external information or the second external information obtained by processing the image information, and
wherein the remote operator determines the autonomous mobility by comparing the image information with the recognition result, and inputs the determination using the control device.

13. The moving body control system according to claim 11, wherein the control device is further configured to display two-dimensional or three-dimensional point group information from a sensor installed on the moving body, and a recognition result of external information obtained by processing the point group information, and
wherein the remote operator determines the autonomous mobility by comparing the point group information with the recognition result, and inputs the determination using the control device.

14. The moving body control system according to claim 1, wherein, when an obstacle that blocks a path of the moving body is detected, and the vehicle temporarily enters an area where another moving body passes in an oncoming direction to avoid the obstacle, the moving body control device is further configured to switch to the remote control in response to a determination that there is a possibility of collision with the other moving body.

15. The moving body control system according to claim 1, wherein, when an obstacle that blocks a path of the moving body is detected, and the vehicle temporarily enters an area where another moving body passes in an oncoming direction to avoid the obstacle, the moving body control device is further configured to switch to the remote control in response to a determination that traffic regulations prohibit entry into the area.

16. The moving body control system according to claim 1,
wherein, when an obstacle that blocks a path of the moving body is detected, and the vehicle temporarily enters an area where another moving body passes in an oncoming direction to avoid the obstacle, the moving body control device is further configured to switch to the remote control in response to a determination that a person or a signal indicating whether an entrance is allowed exists.

17. The moving body control system according to claim 1,
wherein, in response to a determination that an abnormal operation of the moving body control device is detected, the moving body control device is further configured to switch to the remote control.

18. The moving body control system according to claim 1,
wherein, in response to a determination that another moving body moving in front of the moving body stops and does not move for a predetermined time or more, the moving body control device is further configured to switch to the remote control.

* * * * *